United States Patent
Yaghoobi et al.

(10) Patent No.: US 12,154,197 B2
(45) Date of Patent: Nov. 26, 2024

(54) DETECTING REQUIREMENTS FOR A PRODUCT

(71) Applicant: The Boeing Company, Chicago, IL (US)

(72) Inventors: Ahmad R. Yaghoobi, Issaquah, WA (US); Krishna P. Srinivasmurthy, Bothell, WA (US); Temourshah Ahmady, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 401 days.

(21) Appl. No.: 17/558,317

(22) Filed: Dec. 21, 2021

(65) Prior Publication Data

US 2022/0215605 A1 Jul. 7, 2022

Related U.S. Application Data

(60) Provisional application No. 63/133,906, filed on Jan. 5, 2021.

(51) Int. Cl.
*G06V 30/413* (2022.01)
*G06T 11/60* (2006.01)
*G06V 30/414* (2022.01)
*G06V 30/416* (2022.01)

(52) U.S. Cl.
CPC ............ *G06T 11/60* (2013.01); *G06V 30/413* (2022.01); *G06V 30/414* (2022.01); *G06V 30/416* (2022.01)

(58) Field of Classification Search
CPC ... G06T 11/60; G06T 2200/24; G06V 30/413; G06V 30/414; G06V 30/416; G06V 30/422
See application file for complete search history.

(56) References Cited

U.S. PATENT DOCUMENTS

| | | |
|---|---|---|
| 5,355,314 A | 10/1994 | Feigenbaum |
| 8,545,943 B2 | 10/2013 | Frankenberger et al. |
| 9,375,746 B2 | 6/2016 | Heldt et al. |
| 9,446,426 B2 | 9/2016 | Bausen et al. |

(Continued)

OTHER PUBLICATIONS

Jacobson, A. et al., "Robust Inside-Outside Segmentation using Generalized Winding Numbers," ACM Transaction on Graphics, vol. 32, No. 4, 2013, 12 pages.

*Primary Examiner* — Wesley J Tucker
*Assistant Examiner* — Han Hoang
(74) *Attorney, Agent, or Firm* — Alleman Hall & Tuttle LLP

(57) ABSTRACT

Examples are disclosed herein that relate to detecting product requirements within a digitized document. One example provides a method comprising: identifying a first page as a summary page, the first page comprising a keyword that refers to a second page; and detecting in the first page a first instance of a pattern comprising a first text block adjacent to a first line. A first part name and a first requirement for a first part are extracted from the first text block. In the first page, a second instance of the pattern is detected comprising a second text block adjacent to a second line. The keyword and a second part name are extracted from the second text block. The second part name and a second requirement for a second part are extracted from the second page. The first requirement and the second requirement are output for storage in a data store.

20 Claims, 19 Drawing Sheets

(56) References Cited

U.S. PATENT DOCUMENTS

| | | | |
|---|---|---|---|
| 9,527,275 B1 | 12/2016 | Flannigan et al. | |
| 10,307,788 B2 | 6/2019 | Arthur et al. | |
| 10,878,270 B1 * | 12/2020 | Cao | G06V 10/82 |
| 2013/0132273 A1 * | 5/2013 | Stiege | G06Q 30/0283 |
| | | | 705/41 |
| 2014/0074455 A1 * | 3/2014 | Galle | G06F 40/186 |
| | | | 704/9 |
| 2021/0331193 A1 | 10/2021 | Yaghoobi et al. | |
| 2022/0343292 A1 * | 10/2022 | Hochman | B64F 5/60 |

* cited by examiner

```
                                                    ┌─ 500
```

WITHIN A DIGITIZED DOCUMENT COMPRISING MULTIPLE PAGES THAT DESCRIBE REQUIREMENTS FOR A PRODUCT, ANALYZE A SELECTED PAGE OF THE MULTIPLE PAGES, THE SELECTED PAGE COMPRISING A PLURALITY OF TEXT BLOCKS AND A PLURALITY OF PARTS, WHEREIN EACH OF THE TEXT BLOCKS IS ASSOCIATED WITH ONE PART OF THE PLURALITY OF PARTS 504

IDENTIFY A CENTROID OF A SELECTED TEXT BLOCK 508

GENERATE A BOUNDARY COMPRISING A PORTION THAT PASSES THROUGH THE CENTROID 512

GENERATE A RECTANGULAR BOUNDARY 516

GENERATE A PLURALITY OF BOUNDARIES, WHEREIN EACH BOUNDARY OF THE PLURALITY OF BOUNDARIES PASSES THROUGH A DIFFERENT CENTROID OF A DIFFERENT TEXT BLOCK; AND EXPAND EACH BOUNDARY OF THE PLURALITY OF BOUNDARIES CONTEMPORANEOUSLY 520

FIG. 5B

AFTER CEASING EXPANSION OF THE BOUNDARY, CONVERT WITHIN THE BOUNDARY A PART NAME AND A REQUIREMENT FOR A PART INTO MACHINE-ENCODED DATA 544

EXTRACT THE PART NAME AND THE REQUIREMENT BY INTERPRETING THE MACHINE-ENCODED DATA 548

EXPAND THE BOUNDARY UNTIL AT LEAST ONE COLLISION OCCURS, THE AT LEAST ONE COLLISION SELECTED FROM (1) THE BOUNDARY COLLIDES WITH ANOTHER BOUNDARY GENERATED FOR ANOTHER TEXT BLOCK, AND (2) THE BOUNDARY COLLIDES WITH A BORDER OF THE SELECTED PAGE 524

MOVE A FIRST SIDE OF THE RECTANGULAR BOUNDARY IN A FIRST DIRECTION AND MOVE A SECOND SIDE OF THE RECTANGULAR BOUNDARY IN A SECOND DIRECTION PERPENDICULAR TO THE FIRST DIRECTION 528

MOVE A THIRD SIDE OF THE RECTANGULAR BOUNDARY IN A THIRD DIRECTION 532

MOVE THE FIRST SIDE OF THE RECTANGULAR BOUNDARY IN THE FIRST DIRECTION UNTIL EITHER (1) THE FIRST SIDE COLLIDES WITH ANOTHER BOUNDARY GENERATED FOR ANOTHER TEXT BLOCK, OR (2) THE FIRST SIDE COLLIDES WITH THE BORDER OF THE SELECTED PAGE; AND AFTER CEASING MOVEMENT OF THE FIRST SIDE OF THE RECTANGULAR BOUNDARY, MOVE THE SECOND SIDE OF THE RECTANGULAR BOUNDARY IN THE SECOND DIRECTION UNTIL EITHER (1) THE SECOND SIDE COLLIDES WITH A DIFFERENT BOUNDARY GENERATED FOR A DIFFERENT TEXT BLOCK, OR (2) THE SECOND SIDE COLLIDES WITH A DIFFERENT BORDER OF THE SELECTED PAGE 536

THE FIRST SIDE OF THE RECTANGULAR BOUNDARY AND THE SECOND SIDE OF THE RECTANGULAR BOUNDARY ARE MOVED CONTEMPORANEOUSLY UNTIL MOVEMENT OF THE FIRST SIDE IS CEASED 540

| DOCUMENT 704 | PART NAME 708 | CAC 712 | DESC. 716 |
|---|---|---|---|
| airline_livery.pdf | Fuselage | CAC 311 | Yellow |
| airline_livery.pdf | Logotype | CAC 7032 | Red |
| airline_livery.pdf | Stripes | CAC 7032 | Red |
| airline_livery.pdf | Stripes | CAC 70856 | White |
| airline_livery.pdf | Stripes | CAC 7032 | Red |
| airline_livery.pdf | Tail Stripe | CAC 7032 | Red |
| airline_livery.pdf | 2.0" Doorband | CAC 70846 | White |
| airline_livery.pdf | Registration | CAC 7032 | Red |

Color Gamut Analytics (Firing-Order & Part Details) 800

Color Region 808

| CAC 870 | Nominal Rollout 866 | Printable? 882 | | | |
|---|---|---|---|---|---|
| (All) ▼ | October 5, 1994 ⟵⊙ December 22, 2020 | (All) ▼ | | | |

| # of Distinct Liveries 824 | Line 872 | dE 868 | Customer 884 | | |
|---|---|---|---|---|---|
| 46 | (All) ▼ | 0.0000 ⊙⟶ 8.1394 | (All) ▼ | | |

| # of Distinct CACs 828 | Model 874 | Stl Point Cloud 876 | Master CAC 886 | | |
|---|---|---|---|---|---|
| 161 | 787 ▼ | (All) ▼ | (All) ▼ | | |

| # of Distinct L, a, b 832 | | Category 878 | Part Detail 880 | Non-Decorative 888 | |
|---|---|---|---|---|---|
| 123 | | (All) ▼ | (All) ▼ | (All) ▼ | |

| | | | CAC 834 | L,a,b (master catalog) 836 | Stl 838 | dE 842 | L,a,b (nearest point) 840 |
|---|---|---|---|---|---|---|---|
| | | | 707 | 34.6125, 52.6225, 39.6499 | Gamut.stl | 0.9795 | 34.7915, 49.3711, 49.3711 |
| | | | 7032 | 30.5100, 47.2674, 30.6075 | Gamut.stl | 0.7714 | 30.5463, 44.9082, 44.9082 |
| | | | | | 2-5color.stl | 0.9494 | 30.7979, 44.4580, 44.4580 |
| | | | | | 4color.stl | 2.6299 | 30.7979, 44.4580, 44.4580 |
| | | | | | NewTest.stl | 4.5197 | 32.2432, 34.6562, 34.6562 |
| | | | 311 | 38.5525, 56.4050, 48.0874 | Gamut.stl | 0.5659 | 38.6407, 54.4250, 54.4250 |

Customer Region 816 / Part Region 812

| File Name 854 | Customer 856 | Cust. Code 858 | Model 860 | Line 862 | Nominal Rollout 864 | CAC Code 844 | Category 846 | Part Detail 848 | Page 850 | Notes 852 |
|---|---|---|---|---|---|---|---|---|---|---|
| airline_livery.pdf | AIRLINE | AIR | 787 | 241 | October 6, 2014 | 707 | Valid part | Horizontal stabilizer | 1 | null |
| | | | | 249 | November 4, 2014 | 7032 | Misc. | Logotype | 2 | null |
| | | | | 255 | November 24, 2014 | | Stripe | Stripe | null | null |
| | | | | 268 | January 2, 2015 | | Misc. | Tail Stripe | 2 | null |
| | | | | 288 | February 25, 2015 | 311 | Misc. | Registration | 2 | null |
| | | | | 290 | March 4, 2015 | 70846 | Valid part | Fuselage | 1 | null |
| | | | | 306 | April 15, 2015 | | Valid part | 2.0" Doorband | 2 | "TAIL STRIPE DETAIL" (see detail page) |
| airline2_livery.pdf | AIRLINE2 | AL2 | 787 | 320 | June 4, 2015 | 707 | Valid part | Horizontal stabilizer | 1 | null |
| | | | | 326 | June 11, 2015 | 70846 | Valid part | Fuselage | 1 | null |
| | | | | 336 | July 9, 2015 | | | | | |

| L, a, b | Customer | Part Detail | CAC Codes | # CAC Codes | Programs | # of Distinct Liveries | # of Distinct L, a, b | dE | Color Gamut |

FIG. 9

Color Gamut Analytics (Firing-Order & Part Details) — 800

| # of Distinct Liveries 824 | CAC 870 | Nominal Rollout 866 | Printable? 882 | Color Region 808 | | | | |
|---|---|---|---|---|---|---|---|---|
| | | October 5, 1994 — December 22, 2020 | | CAC 834 | L,a,b (master catalog) 836 | dE 842 | Stl 838 | L,a,b (nearest point) 840 |
| 46 | (All) ∨ | | (All) ∨ | 707 | 34.6125, 52.6225, 39.6499 | 0.9795 | Gamut.stl | 34.7915, 49.3711, 49.3711 |
| # of Distinct CACs 828 | Line 872 | dE 868 | Customer 884 | 7032 | 30.5100, 47.2674, 30.6075 | 0.7714 | Gamut.stl | 30.5463, 44.9082, 44.9082 |
| 161 | (All) ∨ | 0.0000 — 8.1394 | (All) ∨ | | | 0.9494 | 2-5color.stl | 30.7979, 44.4580, 44.4580 |
| # of Distinct L, a, b 832 | Search | Stl Point Cloud 876 | Search | | | 2.6299 | 4color.stl | 30.7979, 44.4580, 44.4580 |
| | ☑ (All) | (All) ∨ | ☑ (All) | | | 4.5197 | NewTest.stl | 32.2432, 34.6562, 34.6562 |
| 123 | ☑ Null | Category 878 | ☑ AAA | 311 | 38.5525, 56.4050, 48.0874 | 0.5659 | Gamut.stl | 38.6407, 54.4250, 54.4250 |
| | ☑ 6 | (All) ∨ | ☑ ABC | | | | | |
| | ☑ 7 | Part Detail 880 | ☑ AIR | er Region 816 | | Part Region 812 | | |
| File Name 8 | ☑ 8 | (All) ∨ | ☑ AL2 | 58 | Model 860 | CAC Code 844 | Category 846 | Part Detail 848 | Page 850 | Notes 852 |
| | ☑ 9 | | ☑ BBB | | 787 | 707 | Valid part | Horizontal stabilizer | 1 | null |
| airline_livery. | ☑ 10 | Search | ☑ CCC | | | 7032 | Misc. | Logotype | 2 | null |
| | ☑ 11 | ☑ (All) | ☑ DDD | | | | Stripe | Stripe | null | |
| | ☑ 12 | ☑ Misc. | ☑ EEE | | | 311 | Misc. | Tail Stripe | 2 | null |
| | ☑ 13 | ☑ Stripe | ☑ FFF | | | 70846 | Valid part | Registration | 2 | null |
| | ☑ 14 | ☑ Valid Part | ☑ GGG | | | | Valid part | 2.0" Doorband | 1 | "TAIL STRIPE DETAIL" (see detail page) |
| | | | 290 | March 4, 2014 | | 707 | Valid part | Horizontal stabilizer | 1 | null |
| | | | 306 | April 15, 2015 | | 70846 | Valid part | Fuselage | 1 | null |
| airline2_livery.pdf AIRLINE2 | AL2 | | 320 | June 4, 2015 | 787 | | | | | |
| | | | 326 | June 11, 2015 | | | | | | |
| | | | 336 | July 9, 2015 | | | | | | |

| L, a, b | Customer | Part Detail | CAC Codes | # CAC Codes | Programs | # of Distinct Liveries | # of Distinct L, a, b | dE | Color Gamut |

Color Gamut Analytics (Firing-Order & Part Details) — 800

| # of Distinct Liveries 824 | CAC 870 | Nominal Rollout 866 | | Printable? 882 | | Color Region 808 | | | |
|---|---|---|---|---|---|---|---|---|---|
| | | July 22, 2014    December 22, 2020 | | (All) ⌄ | | CAC 834 | L,a,b (master catalog) 836 | dE 842 | Stl 838 | L,a,b (nearest point) 840 |
| 46 | (All) ⌄ | dE 868 | | Customer 884 | | 707 | 34.6125, 52.6225, 39.6499 | 0.9795 | Gamut.stl | 34.7915, 49.3711, 49.3711 |
| # of Distinct CACs 828 | Line 872 | 0.0000 ⊕――― 2.0000 | | (All) ⌄ | | 311 | 38.5525, 56.4050, 48.0874 | 0.5659 | Gamut.stl | 38.6407, 54.4250, 54.4250 |
| 161 | (All) ⌄ | Stl Point Cloud 876 | | ☐ Search | | | | | | |
| # of Distinct L, a, b 832 | Model 874 | (All) ⌄ | Part Detail 880 | ☐ (All) | | | | | | |
| | 787 | Category 878 | (All) ⌄ | ☐ AAA | | | Part Region 812 | | | |
| 123 | | (All) ⌄ | | ☐ ABC | | CAC Code 844 | Category 846 | Part Detail 848 | Page 850 | Notes 852 |
| | | Customer Region 816 | | ☑ AIR | | 707 | Valid part | Horizontal stabilizer | 1 | null |
| File Name 854 | Customer 856 | Cust. Code 858 | Model 860 | ☐ AL2 | al Rollout 864 | 311 | Valid part | Fuselage | 1 | null |
| airline_livery.pdf | AIRLINE | AIR | 787 | ☐ BBB | , 2014 | | | | | |
| | | | | ☐ CCC | r 4, 2014 | | | | | |
| | | | | ☐ DDD | r 24, 2014 | | | | | |
| | | | | ☐ EEE | , 2015 | | | | | |
| | | | | ☐ FFF | 25, 2015 | | | | | |
| | | | | ☐ GGG | | | | | | |
| | | | | 290 | March 4, 2015 | | | | | |
| | | | | 306 | April 15, 2015 | | | | | |
| Customer | Part Detail | CAC Codes | # CAC Codes | Programs | # of Distinct Liveries | # of Distinct L, a, b | dE | ⊞ Color Gamut | | |
| L, a, b | | | | | | | | | | |

DETECTING REQUIREMENTS FOR A PRODUCT

CROSS-REFERENCE TO RELATED APPLICATION

This application claims the benefit of U.S. Provisional Application No. 63/133,906, filed Jan. 5, 2021, which is incorporated herein by reference in its entirety.

FIELD

The subject disclosure relates to automatically detecting requirements for a product within a digitized document. The subject disclosure also relates to displaying paint-related information, part information, and/or customer information relating to the production of products that utilize multiple parts and paint colors, where portions of such information can be automatically extracted from digitized documents.

BACKGROUND

Some engineering and product requirement documents contain large quantities and multiple sections of data that can be organized in a complex manner. For example, aircraft livery documents describe configurations of colors to be painted on an exterior of an aircraft. These livery documents can include a summary page that references other detail pages for more information. Such documents are interpreted and their information input into data stores configured to be queried for later updates and information. However, it is challenging to manually interpret, extract, and input information from large numbers of these documents into a data store. In addition, interpretation errors that occur due to the large amount of information in the documents can result in costly rework.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

Examples are disclosed herein that relate to detecting requirements for a product within a digitized document. One example provides, on a computing device, a method, the method comprising: within a digitized document comprising multiple pages that describe requirements for a product, identifying a first page as a summary page type, the first page comprising a keyword that refers to a second page; and detecting in the first page a first instance of a pattern, the first instance comprising a first text block adjacent to a first line. The method further comprises, on condition of detecting the first instance of the pattern, analyzing the first text block to extract a first part name for a first part and a first requirement for the first part; and detecting in the first page a second instance of the pattern, the second instance comprising a second text block adjacent to a second line. The method further comprises, on condition of detecting the second instance of the pattern, analyzing the second text block to extract the keyword and a second part name for a second part; on condition of extracting the keyword, analyzing the second page to extract the second part name for the second part and a second requirement for the second part; and outputting for storage in a data store the first requirement for the first part and the second requirement for the second part.

BRIEF DESCRIPTION OF THE DRAWINGS

FIGS. 5A and 5B are a flow diagram of an example method for automatically extracting requirements for a product within a digitized document using an extraction technique according to examples of the subject disclosure.

FIG. 7 shows one example of a spreadsheet listing information extracted from a digitized document according to examples of the subject disclosure.

FIG. 8 shows one example of a graphical user interface (GUI) that displays paint-related information, part information, and customer information according to examples of the subject disclosure.

FIG. 9 shows one example of dropdown menus and selector sliders in a GUI according to examples of the subject disclosure.

FIG. 10 shows another example of dropdown menus and selector sliders in a GUI according to examples of the subject disclosure.

FIG. 11 shows another example of dropdown menus and selector sliders in a GUI according to examples of the subject disclosure.

FIG. 12 shows one example of a dropdown menu and selector sliders in a GUI according to examples of the subject disclosure.

FIG. 13 illustrates one example of a use case scenario in which a GUI is used to select and apply multiple criteria to forecast and simulate product deliveries that satisfy the multiple criteria according to examples of the subject disclosure.

FIG. 14 illustrates another example of a use case scenario of a GUI according to examples of the subject disclosure.

FIG. 15 illustrates yet another example of a use case scenario of a GUI according to examples of the subject disclosure.

DETAILED DESCRIPTION

Figure 1:
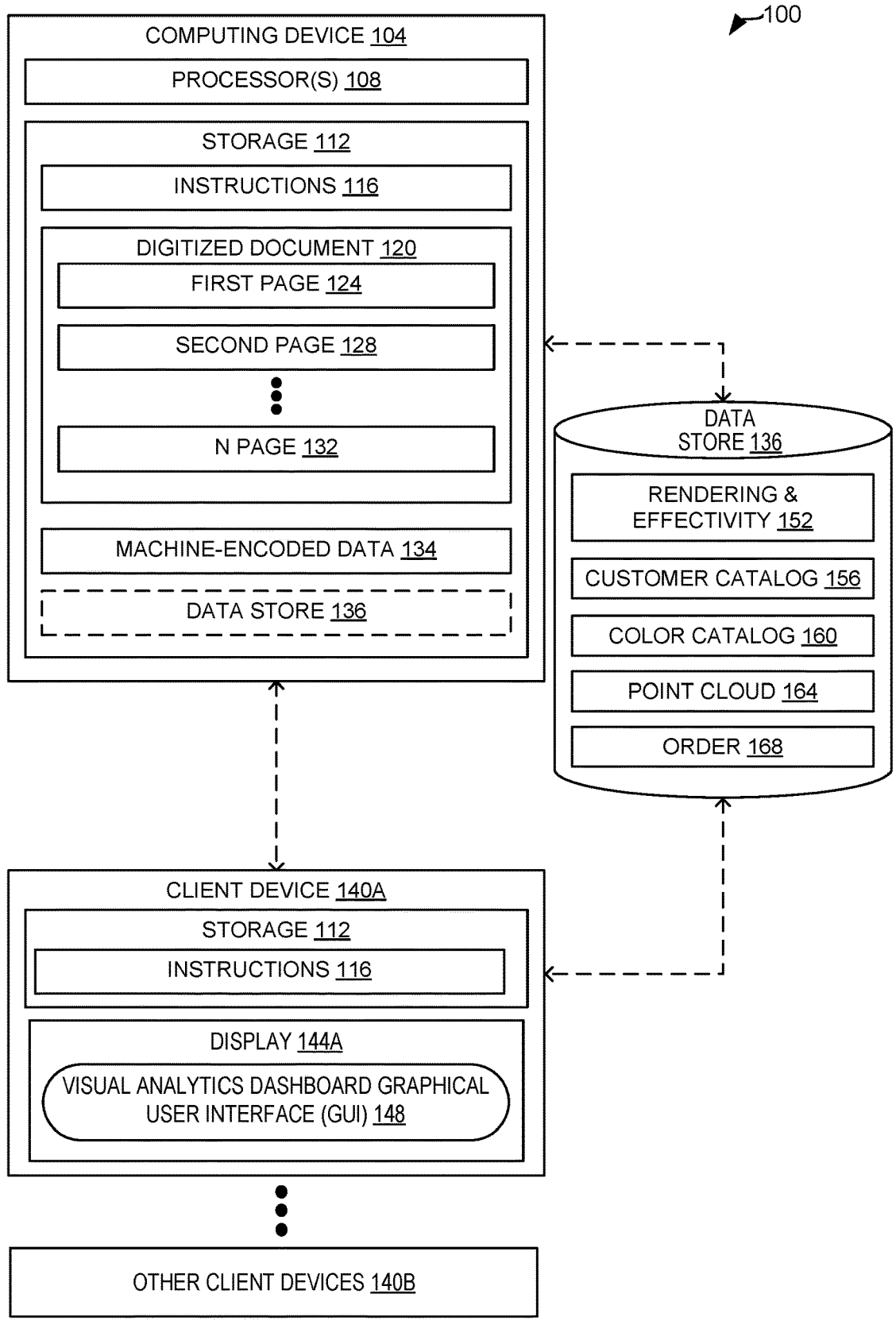
FIG. 1 shows a block diagram of one example of a system for extracting requirements for a product from a digitized document according to examples of the subject disclosure.

As mentioned above, some documents contain large quantities of information located in multiple sections of the document. For example, aircraft livery documents describe configurations of colors to be painted on an exterior of an aircraft. In some examples, a livery document includes a summary page that refers to one or more detail pages for more information and descriptions of how paint is to be applied to the aircraft.

These documents are interpreted and input into data stores that are configured to be queried for later updates and information. In some examples, subject matter experts manually review and enter information from each aircraft livery document into a data store. However, it is challenging, time-consuming, and costly to manually input information from large numbers of such documents. In addition, interpretation errors that occur due to the amount of information in the documents can result in costly rework. For example, errors in an aircraft's paint scheme can be expensive and time-consuming to repair.

Accordingly, the disclosed examples relate to automatically detecting and extracting requirements for a product within a digitized document. Briefly, in a digitized document comprising multiple pages that describe requirements for a product, a first page is identified as a summary page type. The first page comprises a keyword that refers to a second page. A first instance of a pattern is detected in the first page. The first instance comprises a first text block adjacent to a first line. On condition of detecting the first instance of the pattern, the first text block is analyzed to extract a first part name for a first part and a first requirement for the first part.

A second instance of the pattern is detected in the first page, with the second instance comprising a second text block adjacent to a second line. On condition of detecting the second instance of the pattern, the second text block is analyzed to extract the keyword and a second part name for a second part. On condition of extracting the keyword, the second page is analyzed to extract the second part name for the second part and a second requirement for the second part. The first requirement for the first part and the second requirement for the second part are then output for storage in a data store. In this manner, information is quickly extracted from documents and images, preventing defects and errors, and improving cycle-time, productivity, and quality.

One or more technical solutions are present in the illustrative examples that overcome a technical problem with automatically detecting and extracting requirements for a product within a digitized document. As described in more detail below, the illustrative examples allow a computing device to automatically and accurately interpret, extract, and input a variety of information from large numbers of digitized documents into a data store. For example, the examples described herein utilize a series of image processing techniques that automatically identify and extract part name, paint color and dimension data from multiple pages of a digitized document. As a result, one or more technical solutions disclosed herein can provide a technical effect of automatically detecting and extracting requirements for a product within a digitized document more accurately and quickly as compared to current techniques.

With reference now to FIG. 1, one example of a system 100 is illustrated that includes a computing device 104. The computing device 104 comprises one or more processor(s) 108 and storage 112. The storage 112 stores instructions 116 executable by the one or more processor(s) 108 to detect and extract requirements for a product within a digitized document 120 using the techniques described herein. Additional details regarding the components and computing aspects of the computing device 104 are described in more detail below with reference to FIG. 16.

As described above, in some examples, the digitized document 120 comprises an aircraft livery document. One example of an aircraft livery document is described in more detail below with reference to FIG. 2. In other examples, the digitized document 120 takes the form of other types of engineering documents and product requirement sheets, or any other suitable type of document. In some examples, the digitized document 120 is formatted as a Portable Document Format (PDF) document. In other examples, the digitized document 120 can be formatted as an image file (e.g. a JPEG image), a computer-aided design (CAD) file, or generated from a computer-aided design file, or can have any other suitable format.

In some examples, the digitized document 120 comprises a plurality of pages including a first page 124, a second page 128, and optionally one or more additional pages up to an $N^{th}$ page 132. Each page can contain multiple sections of data that include text, drawings and/or images. As described in more detail below, the computing device 104 is configured to detect and extract product requirements from the plurality of pages of the document 120. The product requirements can include different product specifications, such as paint colors, dimension data, and/or other specifications for the product and parts of the product.

In some examples, the product requirements and other information are converted into machine-encoded data 134, from which the product requirements and other information are extracted. The product requirements and any other suitable information are output for storage in a data store 136. In some examples, the data store 136 is located within the storage 112 of the computing device 104. In other examples, the data store 136 is located remotely. In yet other examples, the data store 136 is distributed between the computing device 104 and one or more remote locations. It will also be appreciated that the data store 136 can be maintained in any other suitable manner.

In some examples, the data store 136 includes a rendering & effectivity data store 152, a customer catalog 156, a color catalog 160, a point cloud data store 164, and an order data store 168. These features of the data store 136 are described in more detail below with reference to FIGS. 8-15.

In some examples, one or more of the computing device 104 and client devices 140*a* and 140*b* are configured to query the data store 136 to obtain updates, forecasts, and other information about a product, product requirements such as paint colors, paint-related information, part information, customer information, and related data. As described in more detail below, one or more of the computing device 104 and the client devices 140*a*, 140*b* are configured to use information from the data store 136 to process such queries and display the results. In the example of FIG. 1, and as described in more detail below, these queries are submitted and the results displayed via a visual analytics dashboard graphical user interface (GUI) 148 displayed on a display 144*a* of the client device 140*a*. In other examples, the visual analytics dashboard GUI 148 can be displayed on a display associated with computing device 104 or another client device 140*b*.

Figure 2:
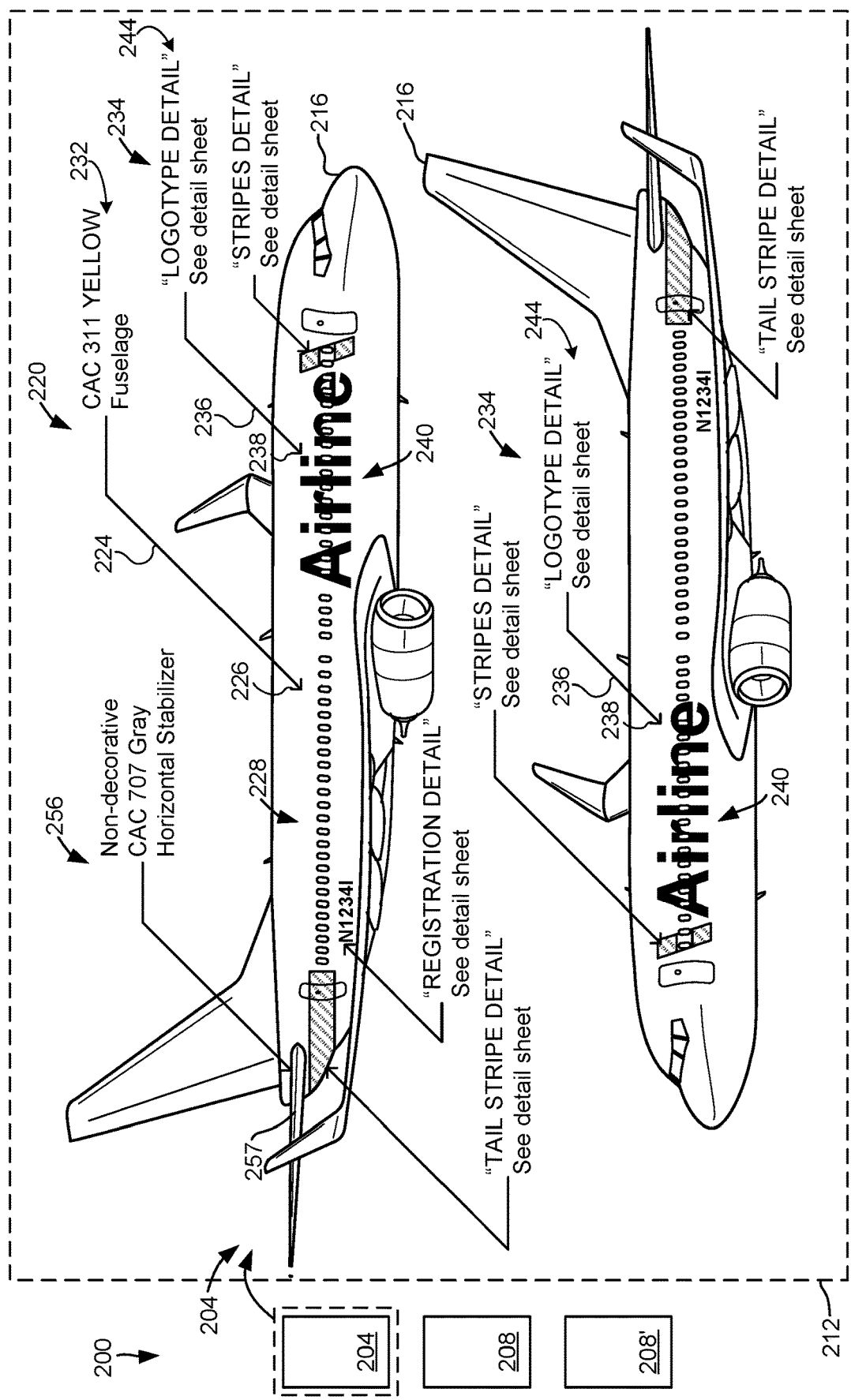
FIG. 2 shows one example of a first page of a digitized document according to examples of the subject disclosure.

With reference now to FIG. 2, one example of a digitized document is illustrated in the form of an aircraft livery document 200. The aircraft livery document 200 includes a first page in the form of a summary page 204, a second page in the form of a detail page 208, and optionally one or more additional detail page(s) 208'. In other examples a digitized document can include a plurality of summary pages and a plurality of detail pages.

FIG. 2 also shows the contents of the summary page 204. The summary page 204 has a border 212. In this example, the border 212 has a rectangular shape. In other examples, the border of a summary page or detail page can have other geometric shapes, such as square or other polygonal shape, circular, oblong, etc. Within the border 212, the summary page 204 includes an illustration of a product, which in this example takes the form of a two-dimensional line drawings of an aircraft 216. In this example the summary page 204 includes two different views of the aircraft 216 from opposing sides. In other examples, the summary page 204 can include more than two different views of the aircraft 216, or a single view of the aircraft 216.

The summary page 204 also includes a plurality of callouts that provide requirements for various parts of the aircraft 216. Each of the callouts includes a line and an adjacent text block. In some of the callouts, the line points to a part of the aircraft and the text block includes a standard color designation code, hereinafter referred to as a company approved color (CAC) code. The CAC code designates a paint color for the particular part of the aircraft. In various examples, a "part" refers to a discrete physical component, a portion of a component, a region of the aircraft, or a location on the aircraft.

FIG. 2 shows a first example callout 220 that includes a line 224 and an arrow 226 that point to a fuselage 228 of the aircraft 216. The first example callout 220 also includes a text block 232. The text block 232 reads "CAC 311 YELLOW" and "Fuselage", indicating a particular CAC paint color for the fuselage 228. In the example of FIG. 2, the first example callout 220 is provided for one view of the aircraft. In other examples, callouts may be provided for the same part on two or more views of the aircraft. For example, the summary page 204 includes a second example callout 234 that is shown on both views of the aircraft.

In some examples, a summary page includes one or more references to one or more detail pages. For example, FIG. 2 shows a second example callout 234 that includes a line 236 and an arrow 238 that point to a customer's airline logotype 240 on the fuselage 228. The second example callout 234 also includes a text block 244 that reads "LOGOTYPE DETAIL" and "See detail sheet", indicating that one or more of the detail pages 208 and 208' provide more information for the airline logotype 240. In the example of FIG. 2, the second example callout 234 is provided on both views of the aircraft.

Figure 3:
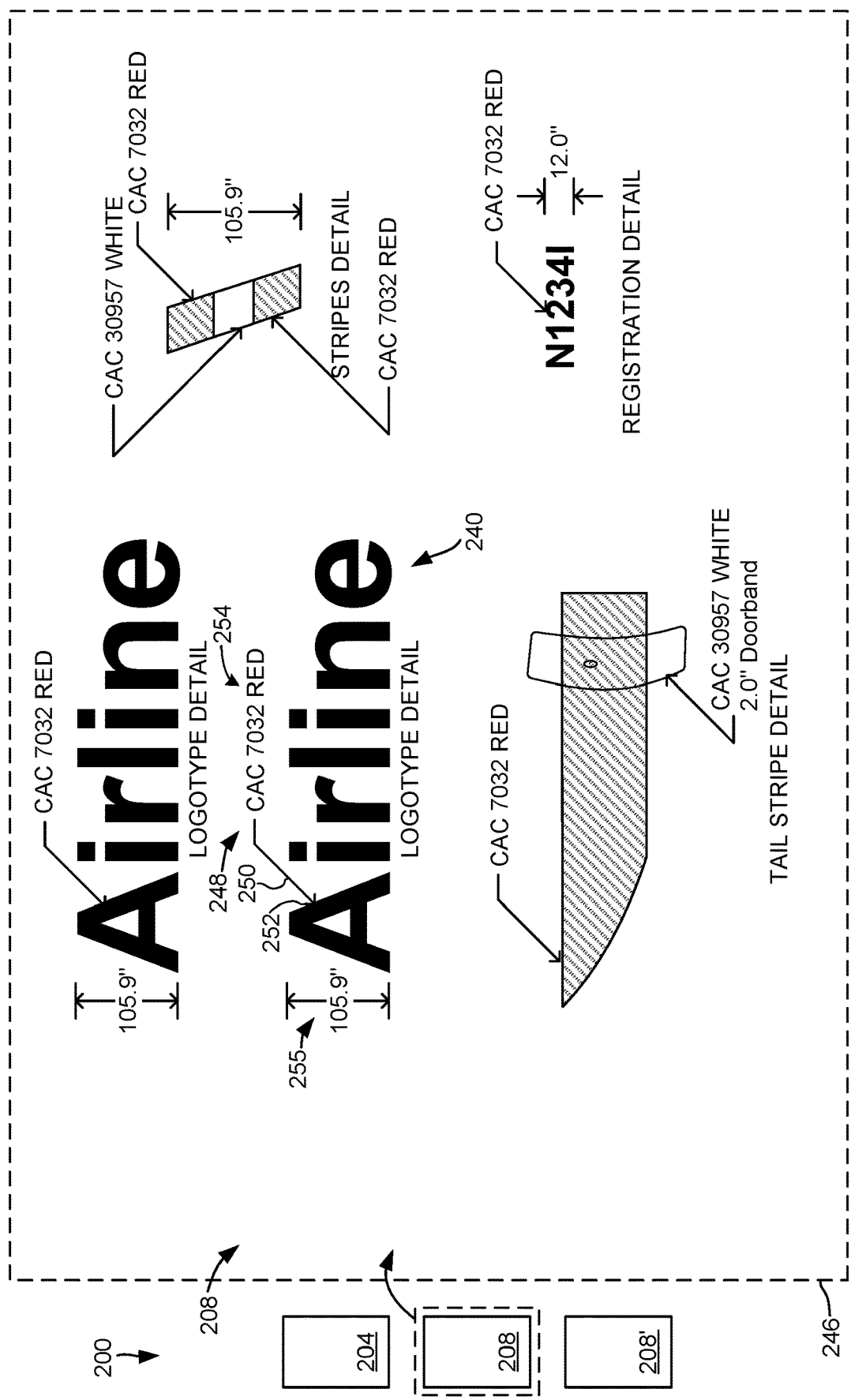
FIG. 3 shows one example of a second page of the digitized document according to examples of the subject disclosure.

In the present example, the one or more detail page(s) 208 and 208' follow the summary page 204. FIG. 3 shows the contents of the detail page 208 within a border 246 of the detail page 208. The detail page 208 includes one or more regions of interest from the summary page 204. For example, the detail page 208 includes an enlarged view of the airline logotype 240 at a higher level of magnification than the summary page 204.

The detail page 208 also includes one or more callouts that provide requirements for one or more parts within each region of interest. For example, FIG. 3 shows a third example callout 248 that includes a line 250 and an arrow 252 that point to the airline logotype 240. The third example callout 248 also includes a text block 254 that reads "CAC 7032 RED", indicating a CAC paint color for the airline logotype 240. The detail page 208 also provides dimension data for one or more parts within regions of interest. For example, the detail page 208 includes a dimension indicator 255 that indicates the airline logotype 240 is 105.9 inches tall.

As introduced above, manually extracting information from digitized documents, such as the aircraft livery document 200, can be challenging. Accordingly, various techniques are described herein to automatically extract requirements for a product within a digitized document.

Figure 4:
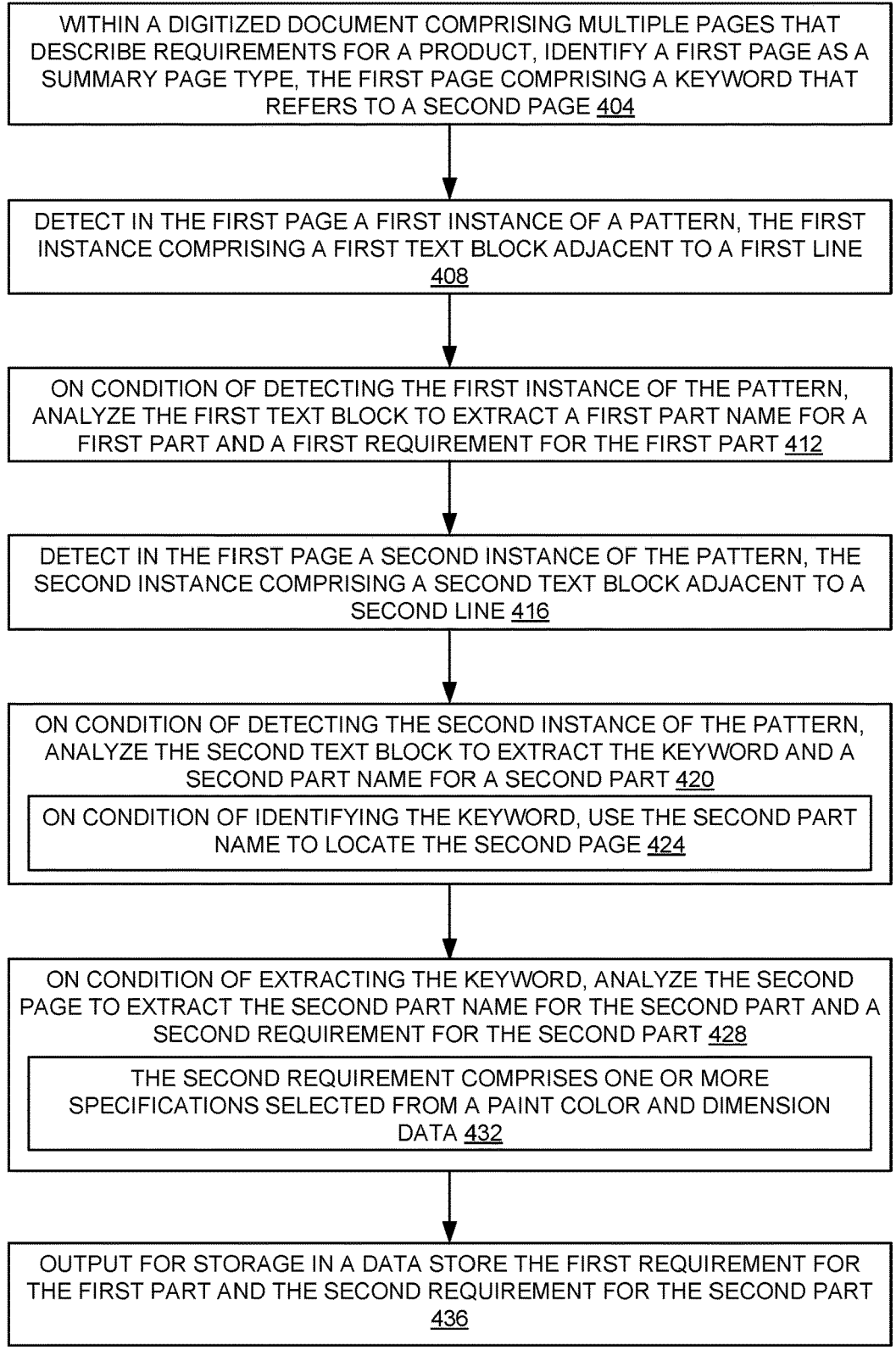
FIG. 4 is a flow diagram of an example method for automatically extracting requirements for a product within a digitized document according to examples of the subject disclosure.

With reference now to FIG. 4, a flow diagram is provided depicting an example method 400 for automatically extracting requirements for a product within a digitized document. The following description of method 400 is provided with reference to the components described herein and shown in FIGS. 1-3, 6A-6C and 7-16. In some examples, the method 400 is performed by the one or more processor(s) 108 of FIG. 1. In other examples, the method 400 is performed in other contexts using other suitable components.

To extract information from the digitized document, the method 400 includes, at 404, within a digitized document comprising multiple pages that describe requirements for a product, identifying a first page as a summary page type, with the first page comprising a keyword that refers to a second page. In some examples, the first page is identified as a summary page type using image classification techniques. For example, and with reference again to FIG. 2, an image may be classified as a summary page type when the image includes two different views of an aircraft. In FIG. 2 the summary page 204 includes two different views of the aircraft 216. Accordingly, the summary page 204 is identified as a summary page type by parsing the aircraft livery document 200 and determining that the first page comprises two different images of the aircraft 216. In some examples, the entire aircraft livery document 200 is parsed, all pages are sorted, and any pages identified as the summary page type are placed into a different folder for further processing.

In some examples, a summary page is identified as a summary page type using one or more deep neural networks (DNNs), such as a Caffe deep learning framework, MobileNetSSD, and/or other suitable DNN. One example implementation is provided below:

Loading Caffe model
    net=cv2.dnn.readNetFromCaffe('MobileNetSSD_deploy.prototxt.txt', 'MobileNetSSD deploy.caffemodel')
    #load the input image and construct an input blob for the image image=cv2.imread('image.jpg')
    blob=cv2.dnn.blobFromImage(cv2.resize(image, (300, 300)), 0.007843, (300, 300), 127.5)
    #pass the blob through the network and obtain the detections and predictions net.setInput(blob)
    detections=net.forward( )
    #loop over the detections
    for i in np.arange(0, detections.shape[2]):
        #extract the confidence (e.g., probability) associated with the prediction
        confidence=detections[0, 0, i, 2]
        #filter out weak detections by ensuring the 'confidence' is
        #greater than a determined minimum confidence
        if confidence>0.8:
            print('airplane is detected')

With reference again to FIG. 4, once the summary page is identified, the method 400 continues, at 408, to detect in the first page a first instance of a pattern. In this example, the pattern is defined as a text block adjacent to a line, where the line points to a part of the aircraft 216. In other examples, the pattern can take any other suitable form. In this example, the text block 232 is a first text block and the line 224 adjacent to the text block is a first line, together forming a first instance of the pattern.

Instances of the pattern in summary page 204 can be identified using a feature extraction technique, such as a Hough Line Transform. The Hough Line Transform extracts line points to identify each line in the summary page 204 and, for each line, identifies a part of the aircraft 216 that the line points to. The Hough Line Transform also indicates a text block adjacent to each line. In some examples, the OpenCV library for computer vision can be used to implement these techniques.

With continued reference to FIG. 4, the method 400 includes, at 412, on condition of detecting the first instance of the pattern, analyzing the first text block to extract a first part name for a first part and a first requirement for the first part. In the text block 232 of FIG. 2, the first part name "Fuselage" and the first requirement "CAC 311" for the fuselage are extracted, along with a description "YELLOW" of the CAC color for the first part.

In some examples, the text block 232 is identified via image processing and object detection techniques using the OpenCV library. In other examples, any other suitable technique may be used. As described in more detail below with reference to FIG. 5A, the Hough Line Transform and text block identification processes can also provide location coordinates for the text block 232.

Once the text block 232 is identified, text is extracted from the text block 232 using optical character recognition (OCR) techniques, such as the Tesseract OCR engine or other suitable text processing techniques. Part names, product requirements, and detail information can be identified using one or more string-matching algorithms or fuzzy searches, such as techniques implementing the "FuzzyWuzzy" Python library. In this manner, desired parts and corresponding product requirement(s) are identified and extracted from the summary page 204.

In some examples, the desired parts and corresponding product requirement(s) exclude non-decorative part information. For example, callout 256 of FIG. 2 points to a horizontal stabilizer leading edge 257. The callout 256 explicitly states that the part information contained therein is "Non-decorative". Accordingly, this information is filtered out.

Returning to FIG. 4, at 416 the method 400 includes detecting in the first page a second instance of the pattern, the second instance comprising a second text block adjacent to a second line. In the example of FIG. 2, the summary page 204 of the aircraft livery document 200 includes a second instance of the pattern described above, such as the text block 244 and the line 236 adjacent to this text block that together form the second example callout 234.

With continued reference to FIG. 4, on condition of detecting this second instance of the pattern, the method 400 includes, at 420, analyzing the second text block to extract a keyword and a second part name for a second part. As introduced above, the keyword refers to another page of the digitized document. For example, the text block 244 of FIG. 2 reads "LOGOTYPE DETAIL" and "See detail sheet". In this example, the keyword is the word "detail." In another example, the keyword can be the phrase "detail sheet." In other examples, the keyword can take the form of any other word, phrase, or other suitable reference to the second page. In this example of text block 244, the second part name that is extracted is "LOGOTYPE," referring to the airline logotype 240.

In some examples, on condition of identifying the keyword, at 424 the method 400 includes using the second part name to locate the second page. For example and with reference again to the text block 244 of FIG. 2, this text block includes the second part name "LOGOTYPE." Accordingly, based on identifying the keyword, the other pages of the airline livery document 200 are parsed to identify a second page that includes the second part name "LOGOTYPE."

Next, and on condition of extracting the keyword, at 428 the method 400 includes analyzing the second page to extract the second part name for the second part and a second requirement for the second part. As described in more detail below, because different detail pages include a wide variety and number of parts having different shapes, along with corresponding part names and requirements, such information is extracted using techniques different from those used for a summary page.

With continued reference to FIG. 4, in some examples, at 432, the second requirement comprises one or more specifications selected from a paint color and dimension data, as described above with reference to FIG. 3. Next, at 436 the method 400 includes outputting for storage in a data store the first requirement for the first part and the second requirement for the second part.

As noted above, in the present example the second page is detail page 208 (see FIG. 3) that includes more illustrations, information and descriptions of how paint is to be applied to the aircraft. In different examples, detail pages can illustrate a single part and its corresponding part name and requirement, or multiple parts and their corresponding part names and requirements. In some examples, a detail page can include 5, 7 or more parts and corresponding part names and requirements.

The inventors have discovered that existing image processing techniques are ill-suited for accurately and consistently identifying, analyzing and extracting information from a wide variety of detail pages that include many different part shapes, corresponding part names and requirements, dimension data, and perhaps other information. Accordingly, and as described in more detail below, individual parts and their related information shown in a detail page are identified and extracted using at least some techniques that are different from those used for a summary page.

More particularly, a series of tessellation techniques are utilized with detail pages to accurately identify individual parts and their corresponding part names, requirements and dimension data by drawing a boundary around each part and its corresponding information. The information for each part is then extracted using one or more OCR methods. As described in more detail below, and in one potential advantage of the subject disclosure, these tessellation techniques provide accurate and consistent results across a wide variety of detail pages that include different numbers of parts, many different part shapes with corresponding part names and requirements, dimension data, and perhaps other information.

With reference now to FIGS. 5A and 5B, a flow diagram is provided depicting an example method 500 for implementing these techniques to automatically extract requirements for a product within a digitized document comprising multiple pages. As explained further below, the method 500 describes a tessellation technique referred to herein as Greedy Overlap Optimizing Box Expansion (GOOBE) that is used to establish boundaries around parts and convert information within the boundaries into machine-encoded data. The following description of method 500 is provided with reference to the components described herein and shown in FIGS. 1-4, 6A-6C and 7-16. Like the method 400, in some examples, the method 500 is performed by the one or more processor(s) 108 of FIG. 1. In other examples, the method 500 is performed in other contexts using other suitable components.

With reference first to FIG. 5A, at 504, the method 500 includes, within a digitized document comprising multiple pages that describe requirements for a product, analyzing a selected page of the multiple pages, the selected page comprising a plurality of text blocks and a plurality of parts, wherein each of the text blocks is associated with one part of the plurality of parts. In the present example the selected page is detail page 208 shown in FIG. 3. As described above for summary page 204, the detail page 208 is analyzed to identify text blocks and their locations within the detail page. This information is used at step 508 of the method 500 to identify a centroid of a selected text block in the detail page 208. Next at step 512 and as described in more detail below, the centroid of the selected text block is used to generate a boundary comprising a portion that passes through the centroid.

Figure 6A:
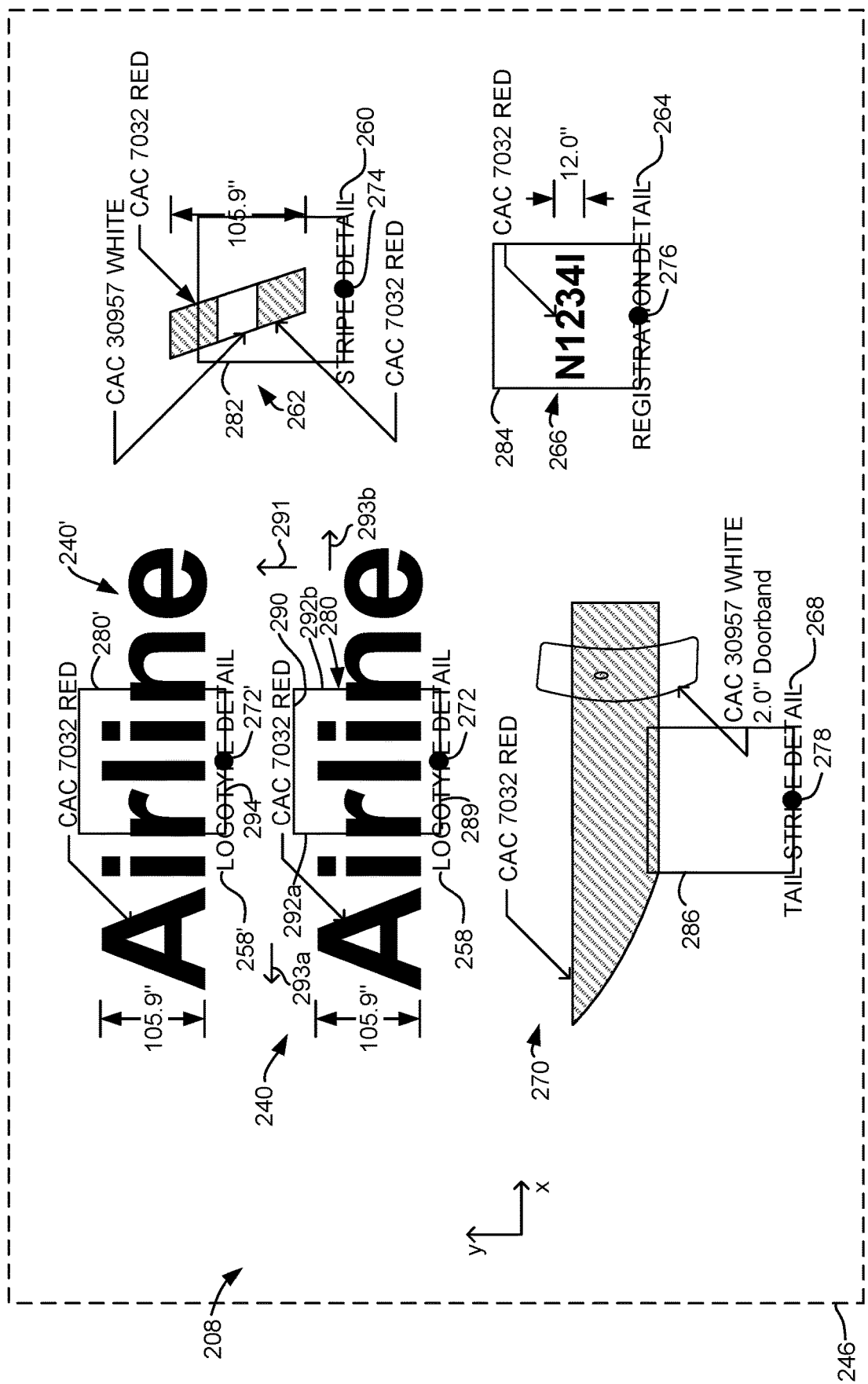
FIGS. 6A-6C illustrate one example implementation of an extraction technique according to examples of the subject disclosure.
Figure 6B:
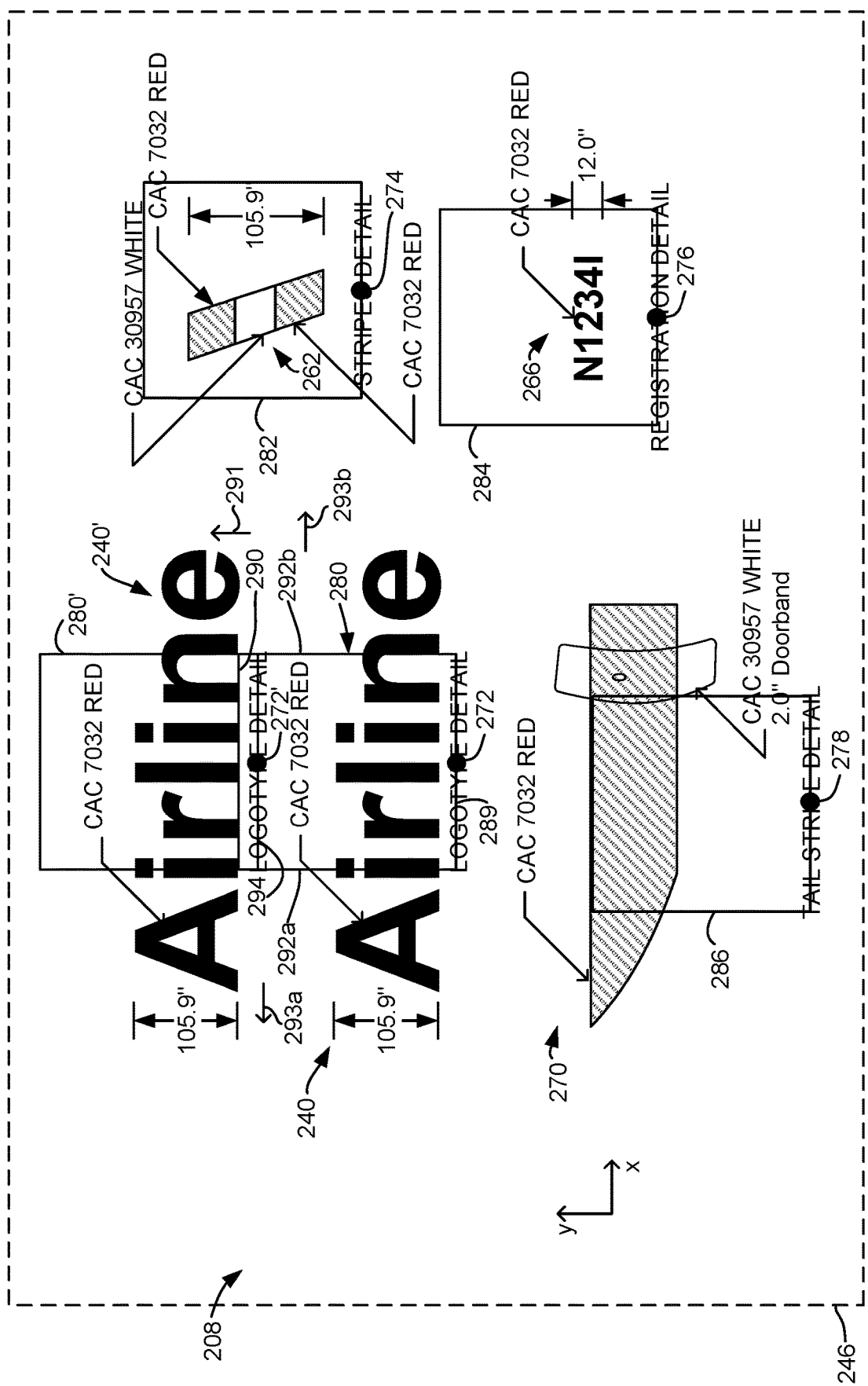
Figure 6C:
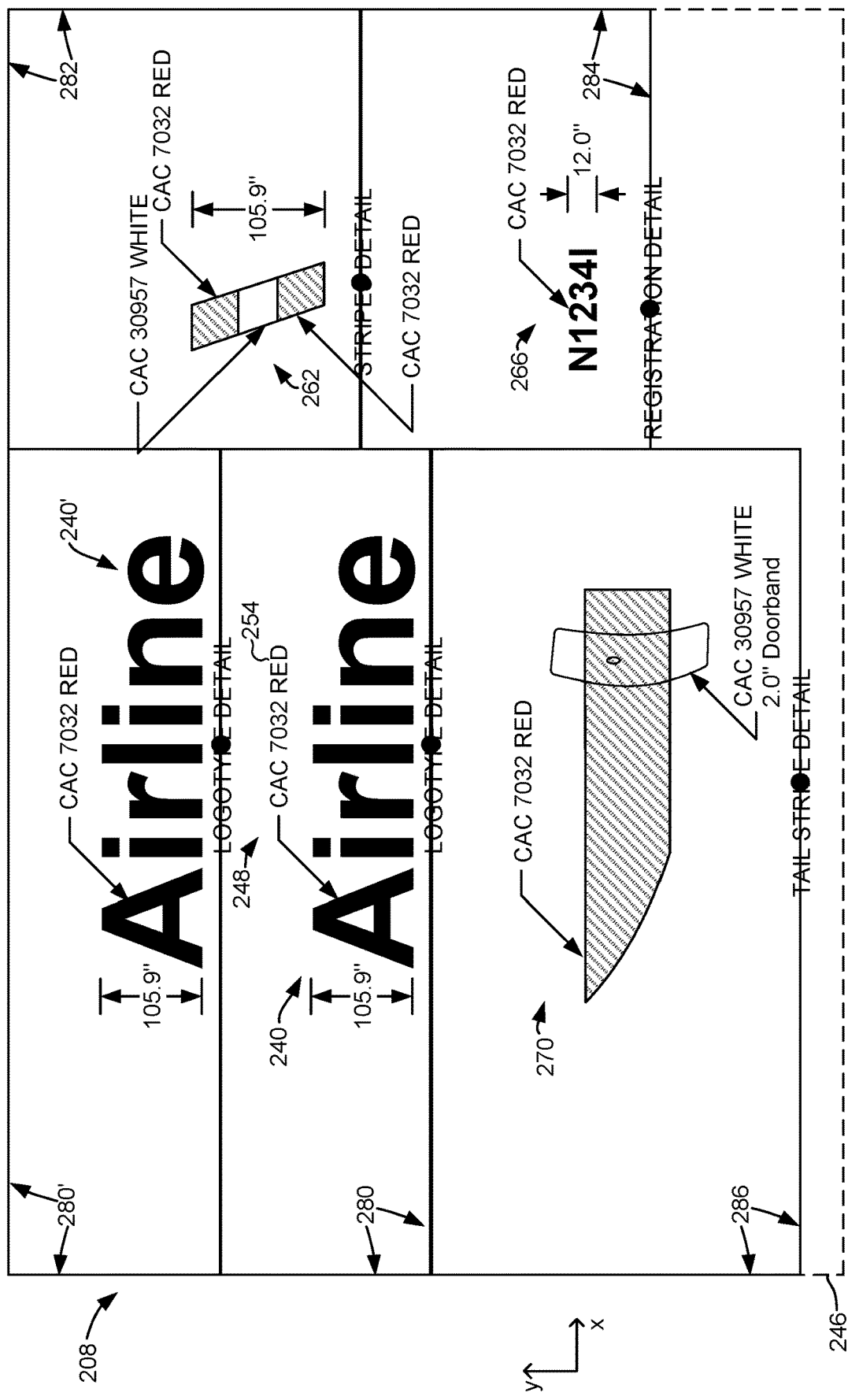

With reference now to FIGS. 6A-6C, the detail page 208 is shown along with the centroid for each text block to illustrate one non-limiting example of applying the GOOBE technique to this page. As described above, the detail page 208 comprises a plurality of text blocks and a plurality of parts, with each of the text blocks associated with one of the parts. For example, text blocks 258 and 258' are associated with the airline logotypes 240 and 240', respectively. Text block 260 is associated with stripes 262, text block 264 is associated with aircraft registration 266, and text block 268 is associated with tail stripe 270.

Text block 258 has a centroid 272, text block 258' has a centroid 272', text block 260 has a centroid 274, text block 264 has a centroid 276, and text block 268 has a centroid 278. In this example, the text blocks are title text blocks that include a part name of a depicted part. The identified text blocks do not include text blocks associated with callout patterns, such as the text block 254 of the callout 248 of FIG. 3. In other examples, any other suitable text blocks or other part location markers are identified.

Returning to FIG. 5A and as noted above, at step 512 of method 500 the centroid of a text block is used to generate a boundary comprising a portion that passes through the centroid. At step 516 of method 500, a rectangular boundary is generated. At step 520, the method 500 includes generating a plurality of boundaries, where each boundary comprises a portion that passes through a different centroid of a different text block. It will be appreciated that, at step 520, the different centroid corresponds to the different text block in the same manner as the centroid of step 512 corresponds to its respective text block. As described in more detail below with reference to FIG. 5B, these boundaries are expanded to surround and capture each part and the information related to that part.

In the example of FIG. 6A, rectangular boundaries 280, 280', 282, 284, and 286 are generated for each of the text blocks 258, 258', 260, 264, and 268, respectively. In this example, each of the boundaries 280, 280', 282, 284, and 286 is initially generated as a square, and each of the boundaries 280, 280', 282, 284, and 286 is initially generated to have the same predetermined size. In other examples, the boundaries can be initially generated as a rectangle with sides of unequal length, or can have other suitable shapes and/or sizes.

As illustrated by example in FIG. 6A, each of the boundaries 280, 280', 282, 284, and 286 has a portion that passes through the centroid of the corresponding text block. The portion of the boundary that passes through the centroid is the bottom side of the square. Using the airline logotype 240 as an example, the boundary 280 has a bottom side 289 that passes through the centroid 272 of the text block 258. In this example, the bottom side 289 is centered on the centroid 272.

The remaining steps of the method 500 will now be described with reference to FIGS. 6A-6C. As described in more detail below, in these steps each of the boundaries is expanded until at least one collision occurs with another boundary generated for another text block and/or with a border of the page. After a boundary has ceased expanding around a part, the part name and requirement for the part into are converted into machine-encoded data and extracted.

More particularly and with reference now to FIG. 5B, at 524 the method 500 includes expanding the boundary until at least one collision occurs. The at least one collision is selected from (1) the boundary colliding with another boundary generated for another text bock, and (2) the boundary colliding with a border of the selected page. At 528, expanding the rectangular boundary comprises moving a first side of the rectangular boundary in a first direction and moving a second side of the rectangular boundary in a second direction perpendicular to the first direction. At 532 the method 500 further includes moving a third side of the rectangular boundary in a third direction.

FIGS. 6A-6C illustrate one example of this process of expanding the boundaries 280, 280', 282, 284, and 286 generated in the detail page 208. Continuing with the example in FIG. 6A of boundary 280 generated for text block 258 that corresponds to airline logotypes 240, the boundary 280 is expanded by moving a first side 290 in a first direction 291 (+y) towards the top of the detail page 208. A second side 292a of the boundary 280 is moved in a second direction 293a (−x) towards the left side of the detail page 208, and a third side 292b of the boundary 280 is moved in a third direction 293b (+x) towards the right side of the detail page 208. The first direction 291 is perpendicular to the second direction 293a and the third direction 293b. The bottom side 289 is maintained at its y-axis position passing through the centroid (i.e., it is not moved in the y-axis direction). In this manner and as shown in FIGS. 6B and 6C, the area contained within rectangular boundary 280 is enlarged.

In some examples, the first side 290, the second side 292a, and the third side 292b initially are moved contemporaneously at the same speed until a collision occurs. Further and as shown in the example of FIGS. 6A-6C, each of the boundaries 280, 280', 282, 284, and 286 is expanded contemporaneously in the manner described above for boundary 280. In the present example, expanding each of the boundaries contemporaneously includes beginning the expansion of each of the boundaries 280, 280', 282, 284, and 286 at the same time. Further and as introduced above, each of the boundaries 280, 280', 282, 284, and 286 continues to expand until each expanding side of that boundary collides with another boundary or the border of the page.

As explained above, in one example a collision occurs when one boundary collides with another boundary. For example, FIG. 6B shows another view of the detail page 208 after the boundaries 280, 280', 282, 284, and 286 have been at least partially expanded. In this example, the boundary 280 is expanded in the first direction 291 until an edge of the airline logotype 240' is identified. In this example, a collision is determined when the first side 290 of boundary 280 collides with and slightly overlaps bottom edge 294 of boundary 280'. As shown in FIG. 6C, in this example after the collision is determined the first side 290 is moved downwardly to be colinear with the bottom edge 294 of boundary 280'. In other examples, a collision is determined upon two boundaries meeting and not overlapping. As described in more detail below with reference to FIG. 6C, a collision also occurs when a boundary collides with the border 246 of the detail page 208.

Once the collision between the first side 290 of boundary 280 and the bottom edge 294 of boundary 280' is determined, the first side 290 ceases moving in the first direction 291. However, the second side 292a and the third side 292b of boundary 280 continue expanding in the second direction 293a and the third direction 293b, respectively. Accordingly, the boundary 280 continues to expand in the second direction 293a and in the third direction 293b until both the second side 292a and the third side 292b collide with a different boundary or with the border 246 of the detail page 208, at which point expansion of the boundary ceases.

With reference again to FIG. 5B, method 500 reflects the above-described process by, at 536, moving the first side of the rectangular boundary in the first direction until either (1) the first side collides with another boundary generated for the another text block, or (2) the first side collides with the border of the page. After ceasing movement of the first side of the rectangular boundary, the method 500 includes moving the second side of the rectangular boundary in the second direction until either (1) the second side collides with a different boundary generated for a different text block, or (2) the second side collides with a different border of the second page. At 540 and as described above, the method 500 includes moving the first side of the rectangular boundary and the second side of the rectangular boundary contemporaneously until movement of the first side is ceased.

FIG. 6C shows the detail page 208 after the boundaries 280, 280', 282, 284, and 286 have each stopped expanding. In the example of FIG. 6C, the boundary 280 fully encloses the airline logotype 240, and is bordered by the boundary 282 of the stripes 262, the boundary 284 of the aircraft registration 266, the boundary 286 of the tail stripe detail 270, the boundary 280' of the other airline logotype 240', and the border 246 of the detail page 208. As illustrated by example in FIG. 6C, each of the boundaries 280, 280', 282, 284, and 286 contacts a portion of the border 246 of the detail page 208. In some examples, each of the boundaries 280, 280', 282, 284, and 286 contact different, discrete portions of the border 246. In other examples, one or more boundaries contact only other boundaries and do not contact the border of a page.

With reference again to FIG. 5A, after ceasing expansion of the boundary, at 544 the method 500 includes converting within the boundary a part name and a requirement for a part into machine-encoded data. At 548, the part name and the requirement are extracted by interpreting the machine-encoded data.

In one example and with reference to FIG. 6C, the area within each of the boundaries 280, 280', 282, 284, and 286 is marked as a region of interest in an OCR tool. Within each of the boundaries, the text in each text block of each callout is translated into machine-encoded data, which is interpreted to extract information about the aircraft. For example, the text block 254 of the callout 248 is identified as described above. Characters within the text block 254 are translated into text. In this example, the text is then processed to extract the CAC code ("CAC 7032") and color description ("RED") of the airline logotype 240.

As noted above, the information extracted from detail pages is output for storage in a data store, such as data store 136 in FIG. 1. In some examples, such information is retrieved from the data store and displayed to a user in a variety of formats, such as a list or a spreadsheet. FIG. 7 shows one example of a spreadsheet 700 that lists part names 708, product requirements in the form of CAC codes 712, and descriptions 716 of each color represented by a CAC code that are extracted from the summary page 204 and detail page 208 described above. Spreadsheet 700 also displays the document name 704 "airline_livery.pdf" that corresponds to the digitized airline livery document 200 containing summary page 204 and detail page 208. In some examples, this information is used to generate detailed production analytics for paint-related information and part information, with such information displayed via the visual analytics dashboard GUI 148 mentioned above and described in more detail below.

As introduced above with reference to the example of FIG. 1, the data store 136 includes a rendering & effectivity data store 152, a customer catalog 156, a color catalog 160, a point cloud data store 164, and an order data store 168. In some examples, these data stores are populated by information extracted from a digitized document as described above. In other examples, at least a portion of these data stores are populated with information received from other resources.

In some examples, the rendering & effectivity data store 152 includes CAC codes, aircraft part categories, and part detail data. The customer catalog 156 provides information and details related to customers purchasing aircraft. The color catalog 160 details each CAC and associated parameters, such as color space values. The point cloud data store 164 includes data describing inkjet point clouds that define color application capabilities for inkjet printers, and calculated distances between CAC color space values and one or more of the inkjet point clouds. The order data store 168 provides information on customer orders and nominal rollout information, such as aircraft models, firing orders, and nominal rollout dates.

As noted above, it is neither practically nor commercially feasible to manually collect, correlate, filter, and process this vast array of information to yield desired outputs, such as simulating product delivery scenarios, predicting resource availability, identifying project data for particular customers, and modeling the effects of various combinations of the foregoing, other variables, and resource information. Furthermore, many existing techniques are not scalable and/or do not provide clear traceability from information in digitized documents to production analytics.

Accordingly, examples are disclosed that relate to methods for displaying on a GUI paint-related information, part information, and customer information relating to the production of products that utilize multiple parts and paint colors. These methods provide information, predictions, and modeling scenarios based on a vast quantity of different types of information. The GUI allows users to filter, investigate, manipulate, discover, and simulate different scenarios related to a product. In the following examples, methods for displaying this information on a GUI are described in the context of the application of colors to an aircraft.

One or more technical solutions are present in the illustrative examples that overcome a technical problem with collecting, correlating, filtering, and displaying paint-related information, part information, and customer information in the context of manufacturing a product, such as an aircraft. The illustrative examples allow a computing device to automatically and accurately collect, correlate, filter, and display such information in a user-friendly manner that facilitates user queries, analytics and clear traceability. For example, the examples described herein enable users to simulate product delivery scenarios, predict resource availabilities, identify project data for particular customers, and model various combinations of the foregoing. As a result, one or more technical solutions disclosed herein can provide a technical effect that facilitates such user queries, simulations, and other analytics utilizing these vast quantities of information in a user-friendly manner that is unattainable with current techniques.

With reference now to FIG. 8, one example of a GUI 800 is illustrated that displays paint-related information, part information, and customer information. The GUI 800 is one example of the visual analytics dashboard GUI 148 displayed on a display 144a of the client device 140a in FIG. 1 discussed above. It will be appreciated that the part information described herein includes part details, part categories, product models, and any other suitable characteristics of a part. The paint-related information, the part information, and the customer information relate to production of products that utilize a plurality of parts and a plurality of paint colors. In the examples described herein, the product is an aircraft. In other examples, the product can comprise any other suitable object.

As described in more detail below, the GUI 800 comprises a user input region 804, a color region 808, a part region 812, and a customer region 816. The user input region 804 receives user inputs, such as menu selections and selectable slider inputs. The color region 808 displays color and paint-related information corresponding to such inputs. The part region 812 displays part-related information corresponding to user inputs, and the customer region 816 displays customer-related information corresponding to such inputs. The GUI 800 also comprises a counter region 820 that displays a number of distinct liveries 824, a number of distinct CACs 828, and a number of distinct color space values L, a, b 832 that also correspond to user inputs in input region 804.

As illustrated by example in FIG. 8, the color region 808 displays paint-related information, such as one or more CAC codes 834 that each correspond to a company-approved color. The color region 808 also displays a set of color space values 836 associated with each CAC code 834. The color space values 836 take the form of a color space 3D point (L, a, b) in a master catalog of colors.

The color region 808 also displays an "Stl" (stereolithography) filename 838 or other identifier associated with an inkjet printer for each CAC code 834. In the example of FIG. 8, four different Stl files are displayed: "Gamut.stl", "2-5color.stl", "4color.stl", and "NewTest.stl". Each Stl file is associated with a different inkjet printer. The Stl file describes a printable color space (i.e., inkjet point cloud) corresponding to that inkjet printer. Additionally, displayed to the right of each Stl filename 838 are the (L, a, b) coordinates of a color space point 840 within the printable color space of the corresponding inkjet printer. This color space point 840 is the color space point nearest to the corresponding master catalog color space point 836 of the corresponding CAC code 834. The color region 808 also displays a Euclidean distance dE 842 between each inkjet color space point 840 and the master catalog color space point 836.

As one example, the CAC code "707" corresponds to a color space point having master catalog (L, a, b) coordinates (34.6125, 52.6225, 39.6499). For printing, the CAC code "707" is assigned to an inkjet printer that is associated with the "Gamut. stl" filename. The point in the color space that is printable by the "Gamut. stl" inkjet print and that is nearest to the master catalog coordinates (34.6125, 52.6225, 39.6499) of CAC code "707" has (L, a, b) coordinates (34.7915, 49.3711, 49.3711). The Euclidean distance dE 842 between these master catalog coordinates and these nearest point coordinates is 0.9795. In other examples where the master catalog coordinates of a CAC code are within the inkjet point cloud of the inkjet printer, the value for the Euclidean distance dE 842 will be zero.

The part region 812 displays part-related information in the GUI 800. The part region 812 is located in a lower-right corner of the GUI 800. The part region 812 includes a CAC code column 844, a part category column 846, a part detail column 848, a page number column 850, and a notes column 852. Each CAC code in the column 844 is associated with a part that is described in the part category column 846, the part detail column 848, and optionally the notes column 852. In some examples, the page column 850 notes a page number in a digitized document where information is found describing the specified part.

The customer region 816 displays customer-related information. The customer-related information includes a file name 854. As illustrated by example in FIG. 8, the file name 854 identifies a livery file that contains paint color requirements for an aircraft. The customer region 816 also includes a customer column 856 that describes a name of a customer, a customer code 858 corresponding to that customer, and a model column 860 describing a model of the aircraft.

The customer region 816 also lists a line number 862 and a nominal rollout date 864 for each aircraft that is utilizing the livery file. For example, the first file name 854 listed in the customer region 816 is "airline_livery.pdf". This file describes paint color requirements of a 787-model aircraft for a customer "AIRLINE" represented by customer code "AIR". In the example of FIG. 8, the "airline_livery.pdf" file corresponds to seven aircraft in production, with line numbers 241, 249, 255, 268, 288, 290, and 306. Each aircraft has an associated nominal rollout date 864 when a production process is due to be completed.

The user input region 804 is located in an upper-left region of the GUI 800, to the right of the counter region 820. The user input region 804 comprises a plurality of user-selectable selectors in the form of one or more dropdown menus and one or more range selector sliders. Each of the selectors corresponds to a criterion from the paint-related information, part-related information, or customer-related information described above. As described in more detail below, the selectors are configured to receive one or more user selections and cause the GUI 800 to display information based on such selection(s).

For example, the nominal rollout slider 866 is configured to receive a selection of a range of rollout dates. In some examples, the nominal rollout slider 866 is used to identify or simulate deliveries of products planned for a selected timeframe. The user input region 804 also includes a dE slider 868 to receive a selection of a range of Euclidian distances from an inkjet point cloud. In some examples, the dE slider is used to specify an acceptable dE range to identify one or more inkjet printers that are capable of printing CAC code colors satisfying the acceptable dE range.

As noted above, the user input region 804 further includes a plurality of dropdown menus that each comprise a plurality of user-selectable check boxes. In the example of FIG. 8, the user input region 804 includes a CAC code dropdown menu 870, a line number dropdown menu 872, a model dropdown menu 874, an Stl point cloud selection dropdown menu 876, a category dropdown menu 878, a part detail dropdown menu 880, a printable dropdown menu 882, a customer dropdown menu 884, a master catalog CAC code dropdown menu 886, and a non-decorative dropdown menu 888.

Figure 9:
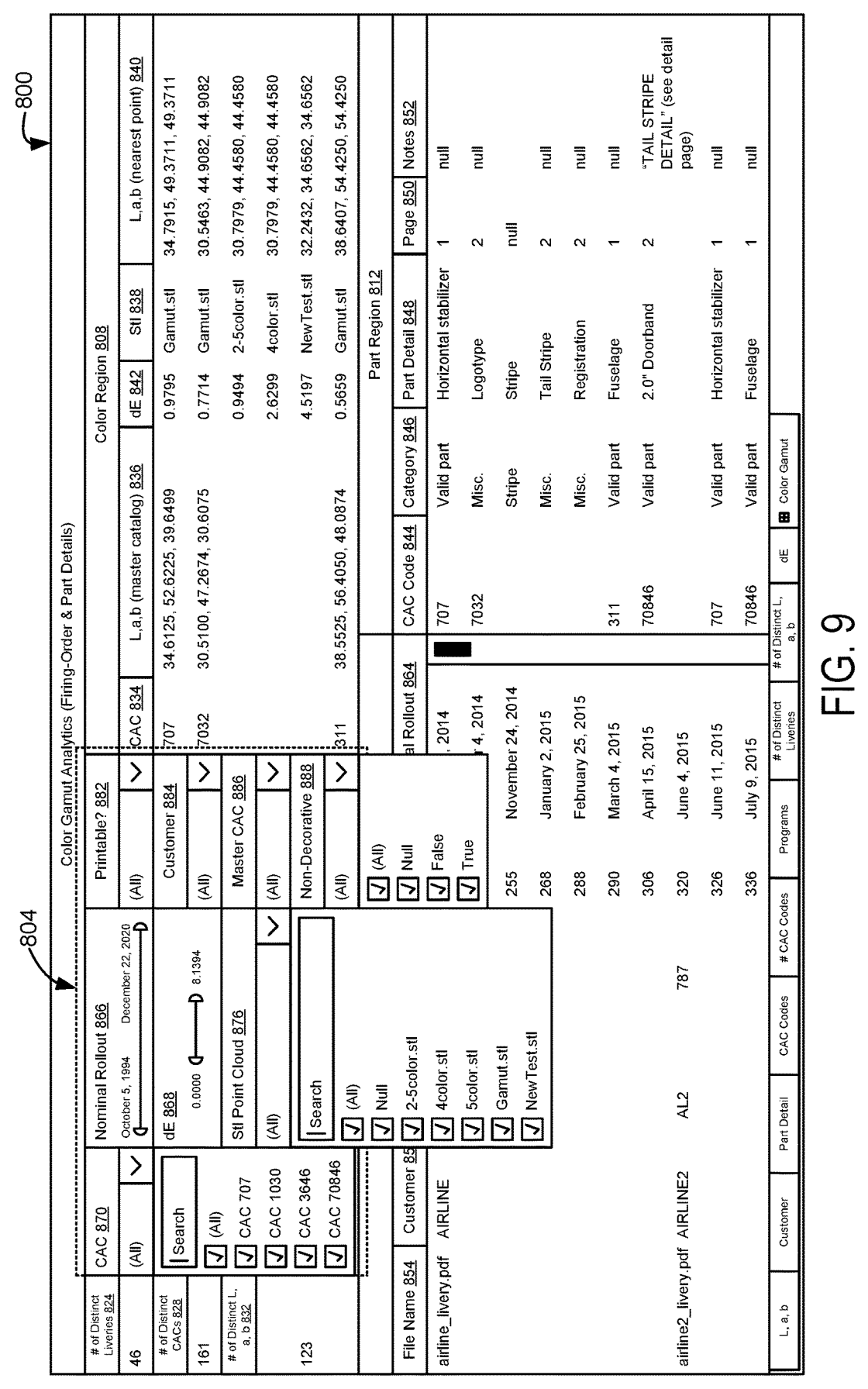

With reference now to FIG. 9, the CAC code dropdown menu 870, the Stl point cloud selection dropdown menu 876, and the non-decorative dropdown menu 888 are expanded. As introduced above, each dropdown menu comprises a plurality of user-selectable check boxes to receive a selection of one or more items. The CAC code dropdown menu 870 is configured to receive one or more user selections of color code(s). In response to such selection(s), the criterion of the selected color code(s) is applied to retrieve information corresponding to the selected color code, such as parts and categories of parts associated with the selected color code, inkjet printer(s) capable of printing the selected color code, along with a deviation dE for each inkjet printer, etc. As described in more detail below in example use cases, the GUI 800 displays the retrieved information in the color region 808, part region 812 and/or customer region 816.

The Stl point cloud selection dropdown menu 876 is configured to receive one or more user selections of inkjet printer point cloud(s). In the example of FIG. 9, each inkjet printer is represented by its associated STL filename. In response to such selection(s), the criterion of the selected inkjet printer point cloud(s) is applied to retrieve information corresponding to the selected inkjet printer point cloud(s), such as at least one CAC code the inkjet printer(s) is capable of printing and a deviation value (dE) associated with that CAC code and the given printer, corresponding information in the part region 212 for the CAC code(s), etc. As described below in example use cases, the GUI 800 displays the retrieved information in the color region 808, part region 812 and/or customer region 816. The non-decorative dropdown menu 888 allows users to specify and examine which CAC colors are used for decorative or non-decorative purposes.

Each drop-down menu further comprises an "(All)" check box, to select all of the check boxes within the dropdown menu. In the example of FIG. 9, all of the check boxes are selected within the CAC code dropdown menu 870, the Stl point cloud selection dropdown menu 876, and the non-decorative dropdown menu 888. In some examples, the dropdown menu comprises a search box for a user to enter one or more search terms and identify one or more corresponding items within the dropdown menu. For example, the CAC code dropdown menu 870 and the Stl point cloud selection dropdown menu 876 include search boxes.

With reference now to FIG. 10, the line number dropdown menu 872, the category dropdown menu 878, and the customer dropdown menu 884 are expanded. The line number dropdown menu 872 is configured to receive user selection(s) of one or more line numbers, which each refer to a specific instance of a product assigned for delivery to a specific customer. In response to such selection(s), the selected line number(s) is utilized to retrieve information corresponding to the specific instance(s) of product(s) that are assigned for delivery to specific customer(s), such as nominal rollout date(s) for such product(s), parts and categories of parts associated with such product(s), filename(s) of paint livery file(s) that contains product requirements for such product(s), CAC code(s) for paint colors utilized with such product(s), etc. As described in more detail below in example use cases, the GUI 800 displays the retrieved information in the color region 808, part region 812 and/or customer region 816.

In one example, and with reference again to FIG. 8, the line number dropdown menu 872 indicates that "(All)" line numbers are selected. The customer region 816 shows each line number 862, along with a file name 854, customer 856, customer code 858, model 860, and nominal rollout date 864 associated with each line number. As one example, line number 241 corresponds to a 787-model aircraft for customer "AIRLINE" (also represented by customer code "AIR"), with a nominal rollout date of Oct. 6, 2014. The "airline_livery.pdf" file contains requirements for this product. Likewise, line number 249 corresponds to a 787-model aircraft for "AIRLINE", with a nominal rollout date of Nov. 4, 2014. The "airline_livery.pdf" document also specifies product requirements for line number 249.

Returning to FIG. 10, the category dropdown menu 878 is configured to receive a user selection of one or more categories of parts. In response to such selection(s), the criterion of the selected category(s) of parts is applied to retrieve information corresponding to the selected category(s), such as one or more CAC color(s) used with such part(s). As described below in example use cases, the GUI 800 displays the retrieved information in the color region 808, part region 812 and/or customer region 816.

The customer dropdown menu 884 is configured to receive user selection(s) of one or more customer(s). In response to such selection(s), the criterion of the selected customer(s) is applied to retrieve information corresponding to such customer(s), such as each customer's deliveries, product models, and CAC colors utilized with such products. As described below in example use cases, the GUI 800 displays the retrieved information in the color region 808, part region 812 and/or customer region 816.

Figure 11:
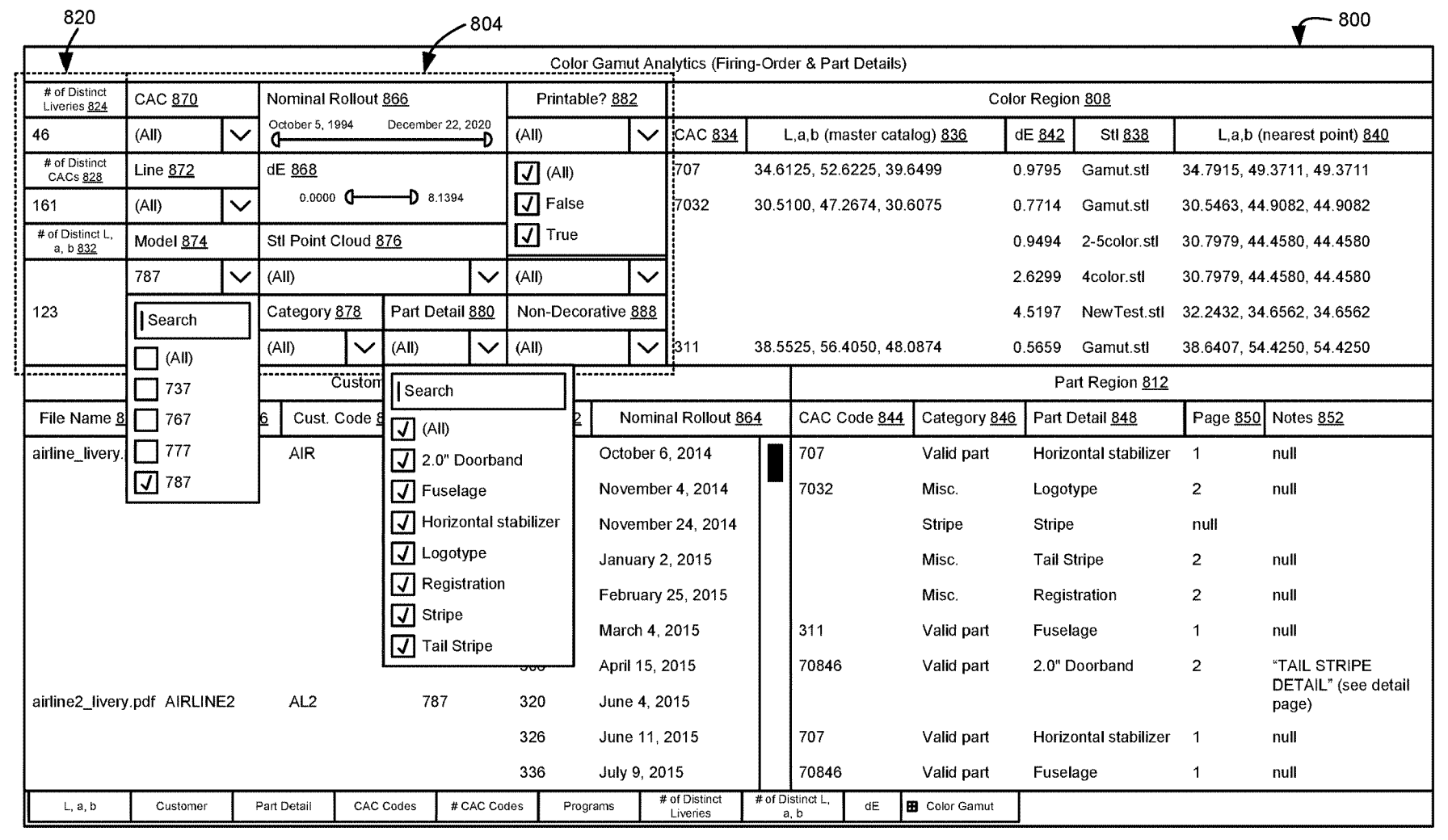

With reference now to FIG. 11, the model dropdown menu 874 and the part detail dropdown menu 880 are expanded. The model dropdown menu 874 is configured to receive user selection(s) of specific model(s) of a product. In response to such selection(s), the criterion of the selected model(s) is applied to retrieve information corresponding to such model(s), such as customers, line numbers, nominal rollout dates and livery document file names for that specific model. As described below in example use cases, the GUI 800 displays the retrieved information in the color region 808, part region 812 and/or customer region 816.

The part detail dropdown menu 880 is configured to receive user selection(s) of part(s) and/or group(s) of parts. In response to such selection(s), the criterion of the selected part(s) is applied to retrieve information corresponding to such parts(s), such as CAC codes used on such parts, customers, line numbers, nominal rollout dates and livery document file names for products utilizing such parts, etc. As described below in example use cases, the GUI 800 displays the retrieved information in the color region 808, part region 812 and/or customer region 816. In the example of FIG. 11, all parts are selected in the part detail dropdown menu 880, and the model "787" is selected in the model dropdown menu 874. Accordingly, the GUI 800 displays information from the data store(s) relevant to all parts of all 787-type aircraft.

As illustrated by example in FIG. 11, the printable dropdown menu 882 is also expanded. The printable dropdown menu 882 is configured to receive one or more user selections that allow a user to identify CAC colors that are printable or not printable by available inkjet printers. In response to such selection(s), the criterion of the selection is applied to retrieve information corresponding to CAC colors that are printable and/or not printable. In this manner and in one example, a user can identify CAC colors that are not printable in order to develop new methods and/or configurations for making such colors available for printing. As described below in example use cases, the GUI 800 displays the retrieved information in the color region 808, part region 812 and/or customer region 816.

Figure 12:
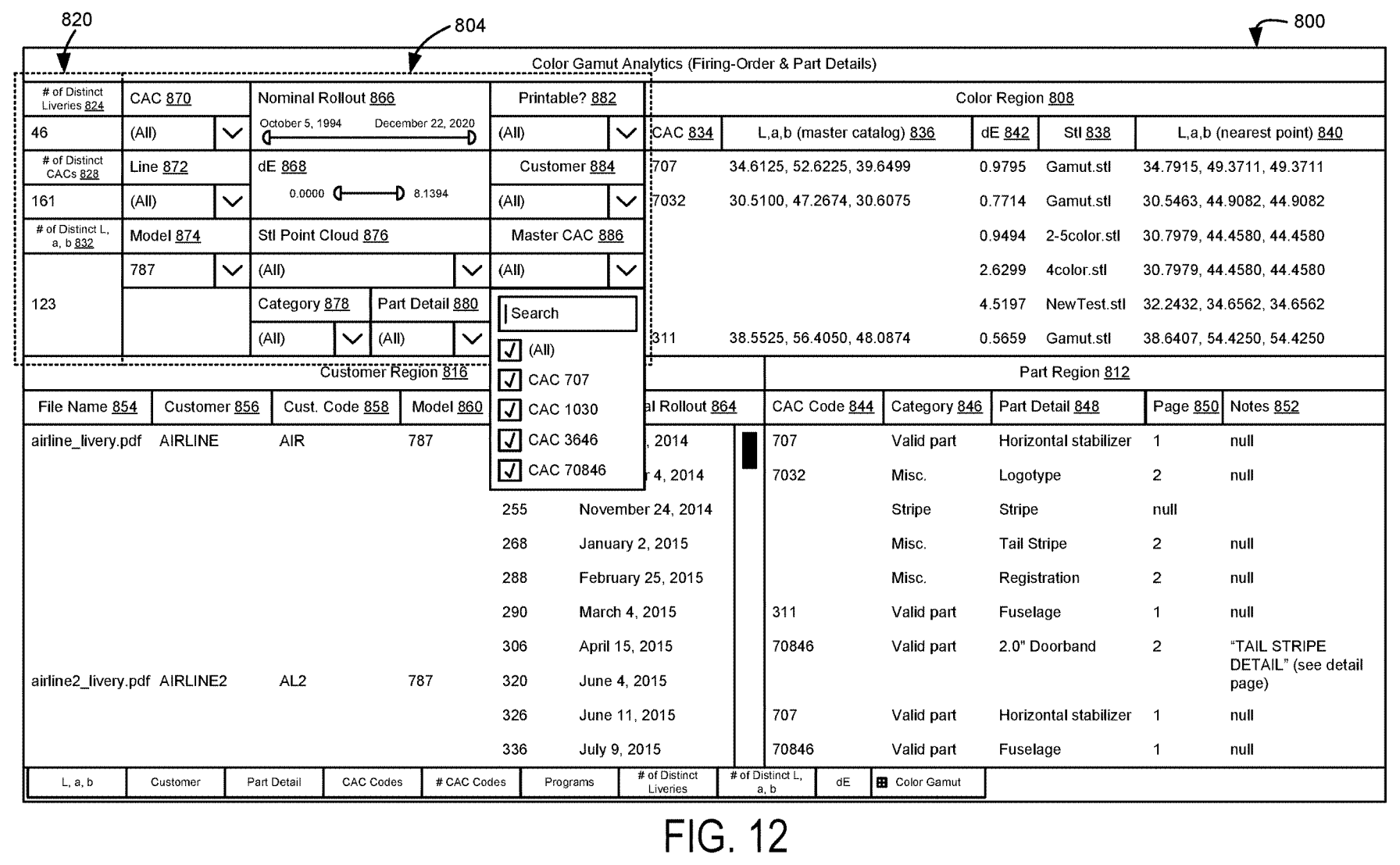

With reference now to FIG. 12, the master catalog CAC code dropdown menu 886 is expanded. The master catalog CAC code dropdown menu 886 is configured to receive user selection(s) of one or more CAC codes. In response to such selection(s), the criterion of the selected CAC code(s) is applied to retrieve information corresponding to CAC code(s), such as parts, customers, line numbers, nominal rollout dates and livery document file names for products utilizing such CAC code(s), inkjet printers (Stl filenames 838) capable of printing such color(s) within a selected dE range 868, etc. As described below in example use cases, the GUI 800 displays the retrieved information in the color region 808, part region 812 and/or customer region 816. The master catalog CAC code dropdown menu 886 also allows a user to identify which CAC codes exist and which CAC codes do not exist in the data store.

Example use cases of the GUI 800 will now be presented. As noted above, in some examples the GUI 800 receives from a user one or more selections of the user-selectable selectors via the user input region 804. In response to the selection(s), one or more criterion corresponding to the selection(s) is applied to retrieve an information subset of the paint-related information, part information, and/or customer information described above. The information subset is displayed in the color region 808, part region 812 and/or customer region 816 of the GUI 800.

In different examples, the GUI 800 enables users to select multiple user-selectable selectors to thereby craft a desired query that culls a desired information subset from one or more data stores according to the selected criteria. In this manner, the GUI enables users to explore, investigate, simulate, and visualize a wide variety of paint-related information, part information, and customer information relating to the production of products. For example, the GUI 800 allows a user to identify deliveries for a particular customer that are planned for a specific period of time by adjusting the nominal rollout slider 866 and selecting the desired customer in the customer menu 884. In another example, the GUI 800 allows users to identify which aircraft livery document(s) (file name 854) utilize one or more CAC code colors, and what categories and parts are associated with those CAC colors, by selecting the desired CAC code(s) in CAC menu 870.

With reference now to FIG. 13, one example is illustrated in which the GUI 800 of FIG. 8 is used to select and apply multiple criteria to forecast and simulate product deliveries that satisfy the multiple criteria. In the example of FIG. 13, aircraft deliveries for customer "AIRLINE" (customer code "AIR") are simulated between Jul. 22, 2014 and Dec. 22, 2020, with a dE of equal to or less than 2.0. The nominal rollout date slider 866 is set to have a lower bound of Jul. 22, 2014 and an upper bound of Dec. 22, 2020. The dE slider 868 is set to have a lower bound of 0.0000 and an upper bound of 2.0000. In the customer dropdown menu 884, a check box corresponding to the customer code "AIR" representing the customer "AIRLINE" is checked.

As illustrated by example in FIG. 13, after these selections are made the color region 808 displays one inkjet printer (represented by STL filename 838) that is capable of printing within the selected dE range two CAC colors that are used on an aircraft for this customer that has a nominal rollout date within the selected range of dates. The color region 808 also displays the particular dE values 842 for both of the CAC colors 707 and 311 and the available inkjet printer. The part region 812 correspondingly display these two CAC standard colors along with the categories and part details of the parts that are painted with these colors.

Figure 14:
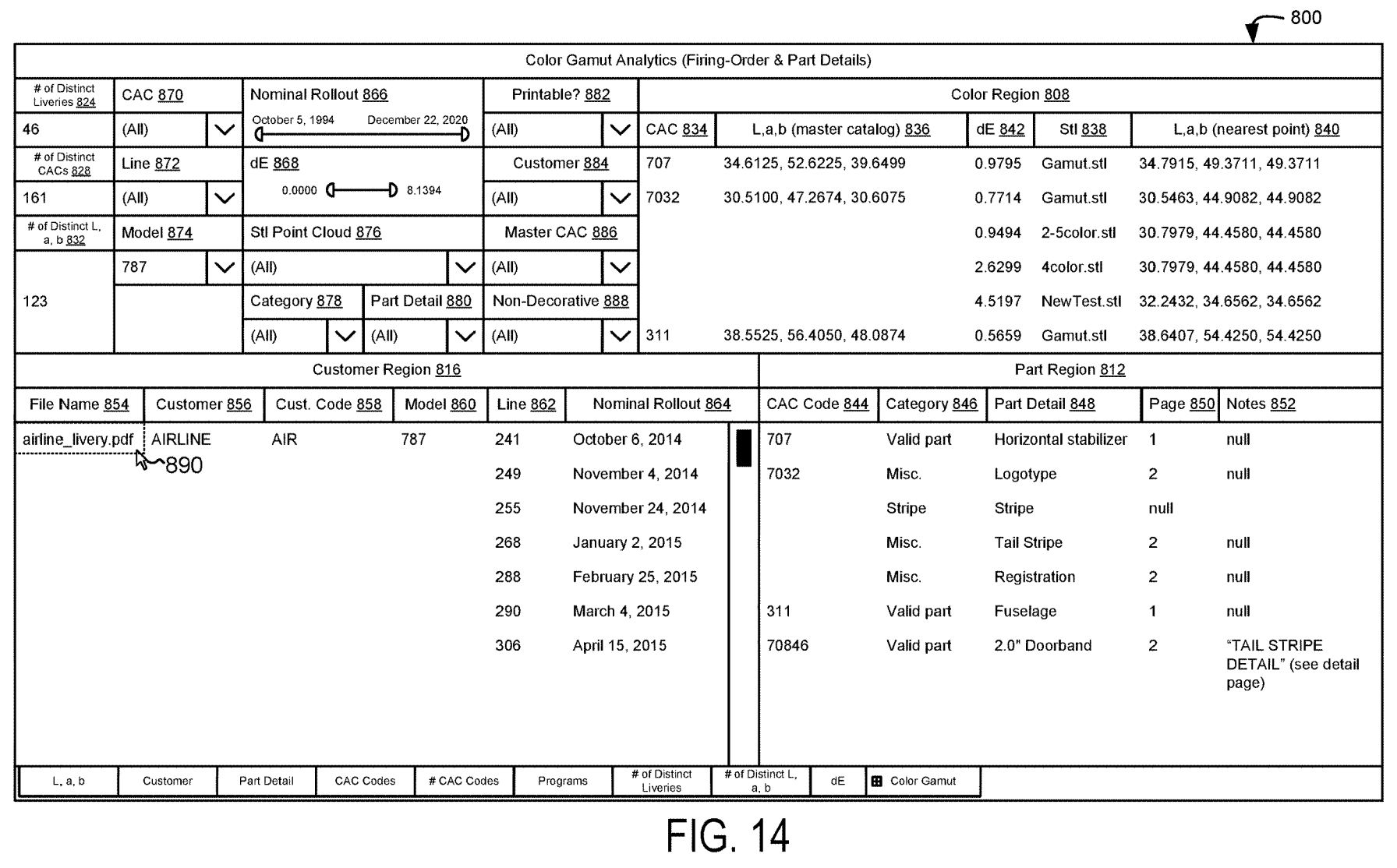

In some examples, one or more items within the color region 808, the part region 812, and/or the customer region 816 are user-selectable. In one example, in customer region 816 the file name 854 is selectable to display paint-related information, part information, and customer information for the specific livery document represented by the file name. With reference now to FIG. 14, a livery file name 854 "airline_livery.pdf" is selected by a cursor 890. This selection causes the GUI 800 to display in the color region 808 the CAC colors 834 referenced in the livery document. Similarly and in the part region 812, these colors and the part information for the parts in "airline_livery.pdf" that utilize these colors is displayed.

Figure 15:
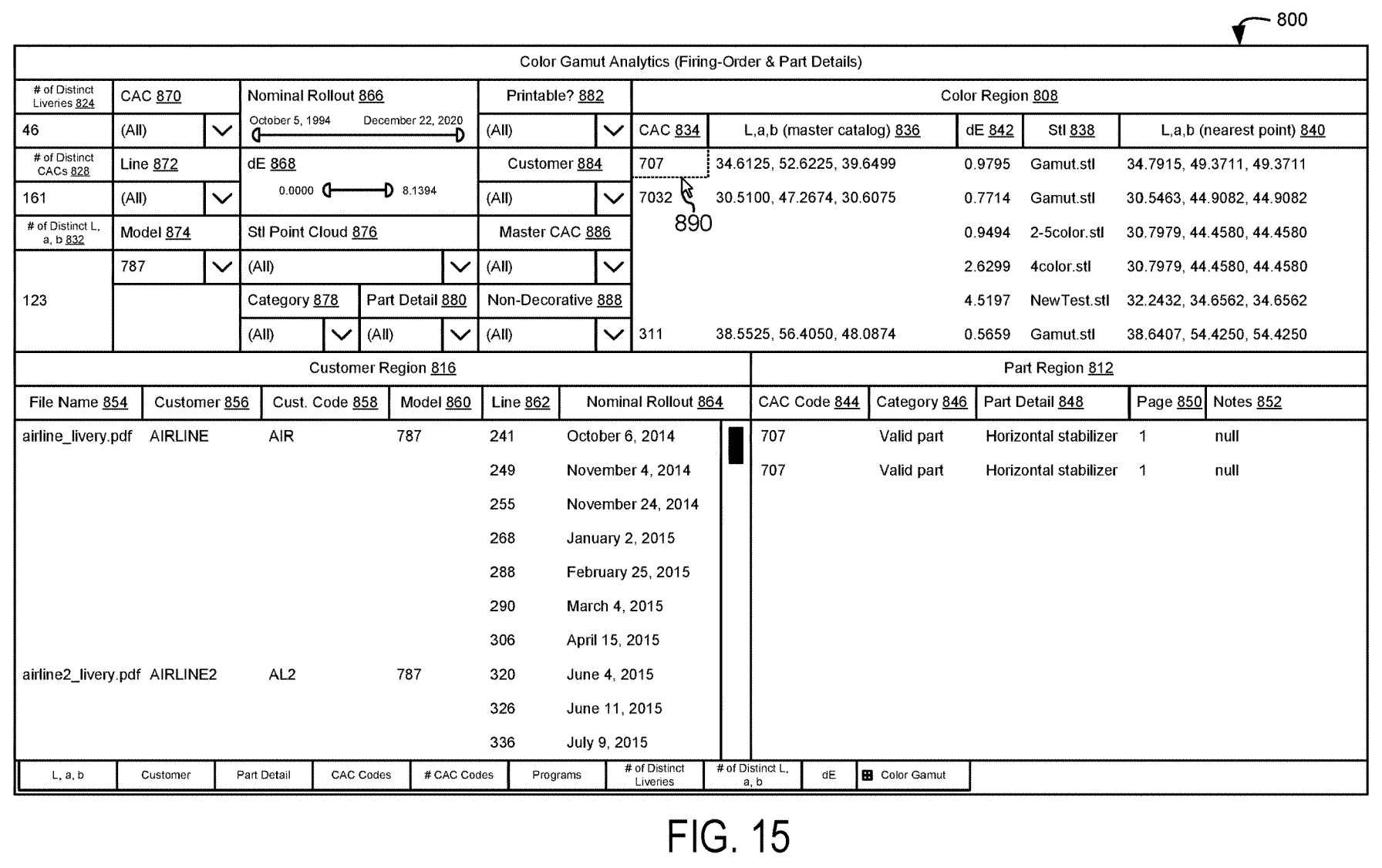

In another example and with reference now to FIG. 15, in the color region 808 the CAC code 834 is selectable to display the livery file names 854 that include the selected CAC code as well as part detail information for the parts in those livery files that are painted with this CAC color. In the example of FIG. 15, a CAC code "707" is selected in the color region 808. This selection causes the GUI 800 to display in the customer region 816 the livery file names that correspond to livery documents that include CAC code "707." The user selection of the CAC code "707" also causes display in the part region 812 of part detail information for the parts in those livery files that are painted with CAC color "707."

In some embodiments, the examples described herein can be tied to a computing system of one or more computing devices. In particular, such methods and processes can be implemented as a computer-application program or service, an application-programming interface (API), a library, and/or other computer-program product.

Figure 16:
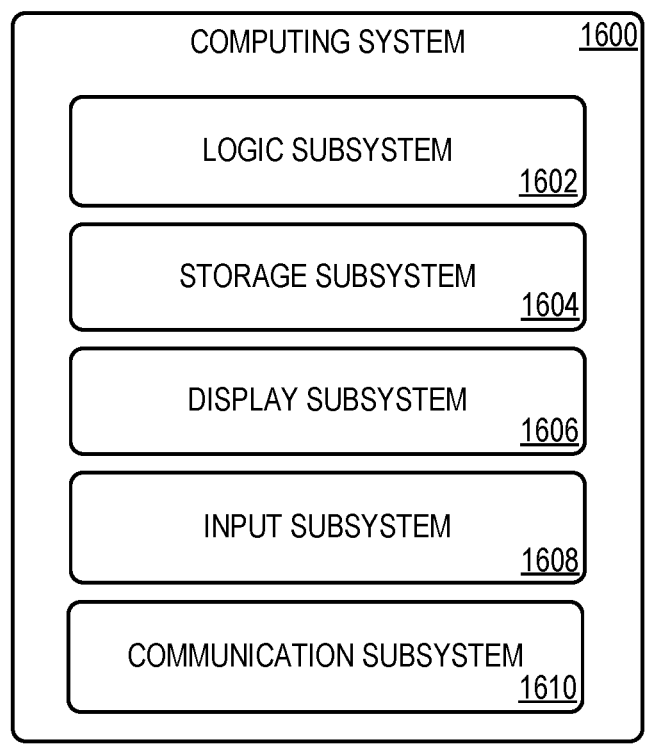
FIG. 16 shows a block diagram of an example computing system according to examples of the subject disclosure.

FIG. 16 schematically shows a non-limiting embodiment of a computing system 1600 that can enact one or more of the examples described above. For example, computing system 1600 can be used to execute instructions to implement the system 100, to perform the method 400 and method 500, to display the GUI 800 of FIGS. 8-15, and/or potentially perform other functions utilizing the digitized document 200 of FIGS. 2, 3, and 6A-6C.

Computing system 1600 is shown in simplified form. Computing system 1600 can take the form of one or more personal computers, server computers, tablet computers, network computing devices, mobile computing devices, mobile communication devices (e.g., smart phone), and/or other computing devices.

Computing system 1600 includes a logic subsystem 1602, a storage subsystem 1604, and a display subsystem 1606. Computing system 1600 can optionally include an input subsystem 1608, a communication subsystem 1610, and/or other components not shown in FIG. 16.

Logic subsystem 1602 includes one or more physical devices configured to execute instructions. For example, logic subsystem 1602 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 1602 can be used to execute instructions to implement the system 100, to perform the method 400, to perform the method 500, to display the GUI

800 of FIGS. 8-15, and/or potentially perform other functions with the digitized document 200 of FIGS. 2, 3, and 6A-6C.

Logic subsystem 1602 can include one or more processors configured to execute software instructions. Additionally or alternatively, logic subsystem 1602 can include one or more hardware or firmware logic machines configured to execute hardware or firmware instructions. Processors of logic subsystem 1602 can be single-core or multi-core, and the instructions executed thereon can be configured for sequential, parallel, and/or distributed processing. Individual components of logic subsystem 1602 optionally can be distributed among two or more separate devices, which can be remotely located and/or configured for coordinated processing. Aspects of logic subsystem 1602 can be virtualized and executed by remotely accessible, networked computing devices configured in a cloud-computing configuration.

Storage subsystem 1604 includes one or more physical devices configured to hold instructions executable by logic subsystem 1602 to implement the methods and processes described herein. For example, storage subsystem 1604 can hold instructions executable to implement the system 100, to perform the method 400, to perform the method 500, to display the GUI 800 of FIGS. 8-15, and/or potentially perform other functions with the digitized document 200 of FIGS. 2, 3, and 6A-6C. When such methods and processes are implemented, the state of storage subsystem 1604 can be transformed—e.g., to hold different data.

Storage subsystem 1604 can include removable and/or built-in devices. Storage subsystem 1604 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1604 can include volatile, nonvolatile, dynamic, static, read/write, read-only, random-access, sequential-access, location-addressable, file-addressable, and/or content-addressable devices.

It will be appreciated that storage subsystem 1604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1602 and storage subsystem 1604 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 1606 can be used to present a visual representation of data held by storage subsystem 1604. This visual representation can take the form of a GUI. As the herein described methods and processes change the data held by the storage subsystem 1604, and thus transform the state of the storage machine, the state of display subsystem 1606 can likewise be transformed to visually represent changes in the underlying data. For example, display subsystem 1206 can be configured to display the spreadsheet 700 of FIG. 7 and/or to display the GUI 800 of FIGS. 8-15.

Display subsystem 1606 can include one or more display devices utilizing virtually any type of technology. Such display devices can be combined with logic subsystem 1602 and/or storage subsystem 1604 in a shared enclosure, or such display devices can be peripheral display devices.

When included, input subsystem 1608 can comprise or interface with one or more user-input devices such as a keyboard, mouse, touch screen, or game controller. In some embodiments, the input subsystem 1608 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, input subsystem 1608 can be configured to receive user inputs while implementing the system 100, performing the method 400, performing the method 500, and/or displaying the GUI 800 of FIGS. 8-15.

When included, communication subsystem 1610 can be configured to communicatively couple computing system 1600 with one or more other computing devices. Communication subsystem 1610 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 1610 can allow computing system 1600 to send and/or receive messages (e.g., user inputs while implementing the system 100 and/or interacting with the GUI 800 of FIGS. 8-15) to and/or from other devices via a network such as the Internet. For example, communication subsystem 1610 can be used receive or send graph data and/or graph representations to another computing system. As another example, communication subsystem may be used to communicate with other computing systems during execution of method 400 or 500 in a distributed computing environment.

Further, the disclosure comprises embodiments according to the following clauses:

Clause 1. On a computing device, a method, the method comprising, within a digitized document comprising multiple pages that describe requirements for a product, identifying a first page as a summary page type, the first page comprising a keyword that refers to a second page, detecting in the first page a first instance of a pattern, the first instance comprising a first text block adjacent to a first line, on condition of detecting the first instance of the pattern, analyzing the first text block to extract a first part name for a first part and a first requirement for the first part, detecting in the first page a second instance of the pattern, the second instance comprising a second text block adjacent to a second line, on condition of detecting the second instance of the pattern, analyzing the second text block to extract the keyword and a second part name for a second part, on condition of extracting the keyword, analyzing the second page to extract the second part name for the second part and a second requirement for the second part, and outputting for storage in a data store the first requirement for the first part and the second requirement for the second part.

Clause 2. The method of clause 1, further comprising, on condition of identifying the keyword, using the second part name to locate the second page.

Clause 3. The method of any of clauses 1 or 2, wherein analyzing the second page comprises identifying a centroid of a selected text block comprising the second part name, generating a boundary comprising a portion that passes through the centroid, expanding the boundary until at least one collision occurs, the at least one collision selected from (1) the boundary collides with another boundary generated for another text block, and (2) the boundary collides with a border of the second page, after ceasing expansion of the boundary, converting within the boundary the second part name and the second requirement for the second part into machine-encoded data, and extracting the second part name and the second requirement by interpreting the machine-encoded data.

Clause 4. The method of clause 3, wherein generating the boundary comprises generating a rectangular boundary.

Clause 5. The method of clause 4, wherein expanding the rectangular boundary until at least one collision occurs further comprises moving a first side of the rectangular boundary in a first direction and moving a second side of the rectangular boundary in a second direction perpendicular to the first direction.

Clause 6. The method of clause 5, further comprising moving the first side of the rectangular boundary in the first direction until either (1) the first side collides with the another boundary generated for the another text block, or (2) the first side collides with the border of the second page, and after ceasing movement of the first side of the rectangular boundary, moving the second side of the rectangular boundary in the second direction until either (1) the second side collides with a different boundary generated for a different text block, or (2) the second side collides with the border of the second page.

Clause 7. The method of clause 6, wherein the first side of the rectangular boundary and the second side of the rectangular boundary are moved contemporaneously until movement of the first side is ceased.

Clause 8. The method of clause 5, wherein expanding the rectangular boundary until at least one collision occurs further comprises moving a third side of the rectangular boundary in a third direction.

Clause 9. The method of clause 3, further comprising generating a plurality of boundaries, wherein each boundary of the plurality of boundaries passes through a different centroid of a different text block, and expanding each boundary of the plurality of boundaries contemporaneously.

Clause 10. The method of any of the preceding clauses, wherein the second requirement comprises one or more specifications selected from a paint color and dimension data.

Clause 11. A computing device, comprising one or more processors, and storage comprising instructions executable by the one or more processors to, within a digitized document comprising multiple pages that describe requirements for a product, identify a first page as a summary page type, the first page comprising a keyword that refers to a second page, detect in the first page a first instance of a pattern, the first instance comprising a first text block adjacent to a first line, on condition of detecting the first instance of the pattern, analyze the first text block to extract a first part name for a first part and a first requirement for the first part, detect in the first page a second instance of the pattern, the second instance comprising a second text block adjacent to a second line, on condition of detecting the second instance of the pattern, analyze the second text block to extract the keyword and a second part name for a second part, on condition of extracting the keyword, analyze the second page to extract the second part name for the second part and a second requirement for the second part, and output for storage in a data store the first requirement for the first part and the second requirement for the second part.

Clause 12. The computing device of clause 11, wherein the instructions are further executable to, on condition of identifying the keyword, use the second part name to locate the second page.

Clause 13. The computing device of clauses 11 or 12, wherein the instructions are further executable to identify a centroid of a selected text block, generate a boundary comprising a portion that passes through the centroid, expand the boundary until at least one collision occurs, the at least one collision selected from (1) the boundary collides with another boundary generated for another text block, and (2) the boundary collides with a border of the second page, after ceasing expansion of the boundary, convert within the boundary the second part name and the second requirement for the second part into machine-encoded data, and extract the second part name and the second requirement by interpreting the machine-encoded data.

Clause 14. The computing device of clause 13, wherein the boundary is a rectangular boundary.

Clause 15. The computing device of clause 14, wherein the instructions are further executable to expand the rectangular boundary until at least one collision occurs by moving a first side of the rectangular boundary in a first direction and moving a second side of the rectangular boundary in a second direction perpendicular to the first direction.

Clause 16. The computing device of clause 15, wherein the instructions are further executable to move the first side of the rectangular boundary in the first direction until either (1) the first side collides with the another boundary generated for the another text block, or (2) the first side collides with the border of the second page, and after ceasing movement of the first side of the rectangular boundary, move the second side of the rectangular boundary in the second direction until either (1) the second side collides with a different boundary generated for a different text block, or (2) the second side collides with the border of the second page.

Clause 17. The computing device of clause 16, wherein the instructions are further executable to move the first side of the rectangular boundary and the second side of the rectangular boundary contemporaneously until movement of the first side is ceased.

Clause 18. The computing device of clause 13, wherein the instructions are further executable to generate a plurality of boundaries, wherein each boundary of the plurality of boundaries passes through a different centroid of a different text block, and expand each boundary of the plurality of boundaries contemporaneously.

Clause 19. On a computing device, a method, the method comprising, within a digitized document comprising multiple pages that describe requirements for a product, analyzing a selected page of the multiple pages, the selected page comprising a plurality of text blocks and a plurality of parts, wherein each of the text blocks is associated with one part of the plurality of parts, identifying a centroid of a selected text block of the plurality of text blocks, generating a boundary comprising a portion that passes through the centroid, expanding the boundary until at least one collision occurs, the at least one collision selected from (1) the boundary collides with another boundary generated for another text bock of the plurality of text blocks, and (2) the boundary collides with a border of the selected page, after ceasing expansion of the boundary, converting within the boundary a part name and a requirement for a selected part of the plurality of parts into machine-encoded data, and extracting the part name and the requirement by interpreting the machine-encoded data.

Clause 20. The method of clause 19, wherein the analyzing of the selected page is performed on condition of extracting, from a different page of the multiple pages, a keyword that refers to the selected page.

Clause 21. On a computing device, a method for displaying paint-related information, part information, and customer information on a graphical user interface (GUI), the paint-related information, the part information, and the customer information relating to production of products that utilize a plurality of parts and a plurality of paint colors, the method comprising displaying a user input region comprising a plurality of user-selectable selectors that each correspond to a criterion of one of the paint-related information, the part information, or the customer information, displaying the paint-related information in a paint region of the GUI, displaying the part information in a part region of the GUI, displaying the customer information in a customer region of the GUI, receiving from a user, in the user input region of the GUI, a selection of one of the user-selectable selectors, in response to the selection, applying the criterion corresponding to the selection to retrieve an information subset of one or more of the paint-related information, the part information, and the customer information, and displaying the subset of the one or more of the paint-related information, the part information, and the customer information in the corresponding paint region, the part region, or the customer region of the GUI.

Clause 22. The method of clause 21, further comprising receiving from the user, in the user input region of the GUI, a plurality of selections of a plurality of the user-selectable selectors, in response to the plurality of selections, applying the criteria corresponding to the selections to retrieve a plurality of subsets of one or more of the paint-related information, the part information, and the customer information, and displaying the plurality of subsets of one or more of the paint-related information, the part information, and the customer information in the corresponding paint region, the part region, or the customer region of the GUI.

Clause 23. The method of any of clauses 22 or 21, further comprising utilizing the criterion corresponding to the selection to cull the information subset from one or more data stores comprising one or more of the paint-related information, the part information, and the customer information.

Clause 24. The method of any of the preceding clauses, wherein the user input region further comprises one or more user-adjustable range selectors configured to receive input of user range selections, wherein the user range selections are selected from the group consisting of a rollout date and a Euclidean distance from a paint point cloud.

Clause 25. The method of any of the preceding clauses, wherein the user input region further comprises a plurality of dropdown menus that each comprise a plurality of user-selectable check boxes.

Clause 26. The method of any of the preceding clauses, further comprising displaying in the customer region of the GUI one or more livery file names that each contain paint color requirements for a product.

Clause 27. The method of clause 26, further comprising wherein the one or more livery file names are selectable, and wherein a user selection of one of the livery file names causes display in the paint region of paint colors referenced in a livery document corresponding to the one livery file name, and causes display in the part region of part information that utilizes the paint colors displayed in the paint region.

Clause 28. The method of any of the preceding clauses, further comprising displaying in the paint region of the GUI one or more paint color codes that each correspond to a company approved paint color.

Clause 29. The method of clause 28, wherein the one or more paint color codes are selectable, and wherein a user selection of one of the paint color codes causes display in the customer region of one or more livery file names that correspond to a livery document that references the selected one of the paint color codes, and causes display in the part region of part information that utilizes the selected one of the paint color codes in the paint region.

It will be understood that the configurations and/or approaches described herein are exemplary in nature, and that these specific embodiments or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

To the extent that terms "includes," "including," "has," "contains," and variants thereof are used herein, such terms are intended to be inclusive in a manner similar to the term "comprises" as an open transition word without precluding any additional or other elements.

The subject matter of the subject disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method, the method comprising:
    within a digitized document comprising multiple pages that describe requirements for a product, identifying a first page as a summary page type, the first page comprising a depiction of the product and a keyword that refers to a second page;
    detecting in the first page a first instance of a pattern, the first instance comprising a first text block adjacent to a first line pointing to a first part of the product in the depiction of the product, the first text block and the first line together forming the first instance of the pattern;
    on condition of detecting the first instance of the pattern, analyzing the first text block to extract a first part name for the first part and a first requirement for the first part;
    detecting in the first page a second instance of the pattern, the second instance comprising a second text block adjacent to a second line pointing to a second part of the product in the depiction of the product, the second text block and the second line together forming the second instance of the pattern;
    on condition of detecting the second instance of the pattern, analyzing the second text block to extract the keyword and a second part name for the second part;
    on condition of extracting the keyword, analyzing the second page to extract the second part name for the second part and a second requirement for the second part; and
    outputting for storage in a data store the first requirement for the first part and the second requirement for the second part.

2. The method of claim 1, further comprising, on condition of identifying the keyword, using the second part name to locate the second page.

3. The method of claim 1, wherein the analyzing the second page comprises:
- identifying a centroid of a selected text block comprising the second part name;
- generating a boundary comprising a portion that passes through the centroid;
- expanding the boundary until at least one collision occurs, the at least one collision selected from (1) the boundary collides with another boundary generated for another text block, and (2) the boundary collides with a border of the second page;
- after ceasing expansion of the boundary, converting within the boundary the second part name and the second requirement for the second part into machine-encoded data; and
- extracting the second part name and the second requirement by interpreting the machine-encoded data.

4. The method of claim 3, wherein the generating the boundary comprises generating a rectangular boundary.

5. The method of claim 4, wherein the expanding the rectangular boundary until at least one collision occurs further comprises moving a first side of the rectangular boundary in a first direction and moving a second side of the rectangular boundary in a second direction perpendicular to the first direction.

6. The method of claim 5, further comprising:
- moving the first side of the rectangular boundary in the first direction until either (1) the first side collides with the another boundary generated for the another text block, or (2) the first side collides with the border of the second page; and
- after ceasing movement of the first side of the rectangular boundary, moving the second side of the rectangular boundary in the second direction until either (1) the second side collides with a different boundary generated for a different text block, or (2) the second side collides with the border of the second page.

7. The method of claim 6, wherein the first side of the rectangular boundary and the second side of the rectangular boundary are moved contemporaneously until the movement of the first side is ceased.

8. The method of claim 5, wherein the expanding the rectangular boundary until at least one collision occurs further comprises moving a third side of the rectangular boundary in a third direction.

9. The method of claim 3, further comprising:
- generating a plurality of boundaries, wherein each boundary of the plurality of boundaries passes through a different centroid of a different text block; and
- expanding each boundary of the plurality of boundaries contemporaneously.

10. The method of claim 1, wherein the second requirement comprises one or more specifications selected from a paint color and dimension data.

11. A computing device, comprising:
- one or more processors; and
- storage comprising instructions executable by the one or more processors to:
  - within a digitized document comprising multiple pages that describe requirements for a product, identify a first page as a summary page type, the first page comprising a depiction of the product and a keyword that refers to a second page;
  - detect in the first page a first instance of a pattern, the first instance comprising a first text block adjacent to a first line pointing to a first part of the product in the depiction of the product, the first text block and the first line together forming the first instance of the pattern;
  - on condition of detecting the first instance of the pattern, analyze the first text block to extract a first part name for the first part and a first requirement for the first part;
  - detect in the first page a second instance of the pattern, the second instance comprising a second text block adjacent to a second line pointing to a second part of the product in the depiction of the product, the second text block and the second line together forming the second instance of the pattern;
  - on condition of detecting the second instance of the pattern, analyze the second text block to extract the keyword and a second part name for the second part;
  - on condition of extracting the keyword, analyze the second page to extract the second part name for the second part and a second requirement for the second part; and
  - output for storage in a data store the first requirement for the first part and the second requirement for the second part.

12. The computing device of claim 11, wherein the instructions are further executable to, on condition of identifying the keyword, use the second part name to locate the second page.

13. The computing device of claim 11, wherein the instructions are further executable to:
- identify a centroid of a selected text block;
- generate a boundary comprising a portion that passes through the centroid;
- expand the boundary until at least one collision occurs, the at least one collision selected from (1) the boundary collides with another boundary generated for another text block, and (2) the boundary collides with a border of the second page;
- after ceasing expansion of the boundary, convert within the boundary the second part name and the second requirement for the second part into machine-encoded data; and
- extract the second part name and the second requirement by interpreting the machine-encoded data.

14. The computing device of claim 13, wherein the boundary is a rectangular boundary.

15. The computing device of claim 14, wherein the instructions are further executable to expand the rectangular boundary until at least one collision occurs by moving a first side of the rectangular boundary in a first direction and moving a second side of the rectangular boundary in a second direction perpendicular to the first direction.

16. The computing device of claim 15, wherein the instructions are further executable to:
- move the first side of the rectangular boundary in the first direction until either (1) the first side collides with the another boundary generated for the another text block, or (2) the first side collides with the border of the second page; and
- after ceasing movement of the first side of the rectangular boundary, move the second side of the rectangular boundary in the second direction until either (1) the second side collides with a different boundary generated for a different text block, or (2) the second side collides with the border of the second page.

17. The computing device of claim 16, wherein the instructions are further executable to:

move the first side of the rectangular boundary and the second side of the rectangular boundary contemporaneously until the movement of the first side is ceased.

18. The computing device of claim 13, wherein the instructions are further executable to:

generate a plurality of boundaries, wherein each boundary of the plurality of boundaries passes through a different centroid of a different text block; and expand each boundary of the plurality of boundaries contemporaneously.

19. On a computing device, a method, the method comprising:

within a digitized document comprising multiple pages that describe requirements for a product, analyzing a selected page of the multiple pages, the selected page comprising a plurality of text blocks and a plurality of parts, wherein each of the text blocks is associated with one part of the plurality of parts;

identifying a centroid of a selected text block of the plurality of text blocks;

generating a boundary comprising a portion that passes through the centroid;

expanding the boundary until at least one collision occurs, the at least one collision selected from (1) the boundary collides with another boundary generated for another text bock of the plurality of text blocks, and (2) the boundary collides with a border of the selected page;

after ceasing expansion of the boundary, converting within the boundary a part name and a requirement for a selected part of the plurality of parts into machine-encoded data; and extracting the part name and the requirement by interpreting the machine-encoded data.

20. The method of claim 19, wherein the analyzing of the selected page is performed on condition of extracting, from a different page of the multiple pages, a keyword that refers to the selected page.

\* \* \* \* \*